(12) United States Patent
Joseph et al.

(10) Patent No.: US 8,212,377 B2
(45) Date of Patent: Jul. 3, 2012

(54) SMART CONTROL DEVICE

(75) Inventors: Peter D. Joseph, Twin Lakes, WI (US); David A. Saathoff, McHenry, IL (US)

(73) Assignee: J. Baxter Brinkman International Corporation, Dallas, TX (US)

( * ) Notice: Subject to any disclaimer, the term of this patent is extended or adjusted under 35 U.S.C. 154(b) by 511 days.

(21) Appl. No.: 12/334,606

(22) Filed: Dec. 15, 2008

(65) Prior Publication Data

US 2009/0195064 A1 Aug. 6, 2009

Related U.S. Application Data

(60) Provisional application No. 61/026,313, filed on Feb. 5, 2008.

(51) Int. Cl.
*H04B 3/54* (2006.01)
*H02J 3/00* (2006.01)

(52) U.S. Cl. .......................................................... 307/1
(58) Field of Classification Search ........................ 307/1
See application file for complete search history.

(56) References Cited

U.S. PATENT DOCUMENTS

| | | | |
|---|---|---|---|
| 4,540,890 A | 9/1985 | Gangemi et al. | |
| 4,562,382 A | 12/1985 | Elliott | |
| 4,871,944 A | 10/1989 | Skwirut et al. | |
| 4,899,062 A | 2/1990 | Konrad | |
| 5,041,952 A | 8/1991 | Janda et al. | |
| 5,086,267 A | 2/1992 | Janda et al. | |
| 5,221,891 A | 6/1993 | Janda et al. | |
| 5,233,270 A | 8/1993 | Nilssen | |
| 5,378,171 A | 1/1995 | Czerlanis | |
| 5,440,204 A | 8/1995 | Shih | |
| 5,686,799 A | 11/1997 | Moisin et al. | |
| 5,811,938 A | 9/1998 | Rodriguez | |
| 5,938,757 A | 8/1999 | Bertsch | |
| 5,982,645 A | 11/1999 | Levran et al. | |
| 6,005,476 A | 12/1999 | Valiulis | |
| 6,046,914 A * | 4/2000 | Lauter | 363/37 |
| 7,043,611 B2 | 5/2006 | McClannahan | |
| 7,075,414 B2 | 7/2006 | Giannini et al. | |
| 7,615,893 B2 * | 11/2009 | Biester et al. | 307/82 |
| 7,632,159 B2 | 12/2009 | Nelson | |
| 7,652,390 B2 * | 1/2010 | Vrla et al. | 307/1 |
| 2004/0135373 A1 | 7/2004 | Osborne | |
| 2005/0029476 A1 | 2/2005 | Biester et al. | |
| 2005/0195025 A1 | 9/2005 | Leenerts et al. | |
| 2006/0079971 A1 | 4/2006 | Billo | |
| 2006/0250095 A1 | 11/2006 | Min et al. | |
| 2006/0262542 A1 | 11/2006 | Ibbitson et al. | |
| 2007/0222399 A1 | 9/2007 | Bondy et al. | |

(Continued)

FOREIGN PATENT DOCUMENTS

EP 1108610 A2 7/2000

*Primary Examiner* — Hal Kaplan
(74) *Attorney, Agent, or Firm* — Sheppard, Mullin, Richter & Hampton LLP

(57) ABSTRACT

A control device, such as a device for connecting with and providing control data on a low voltage line, is provided disclosed. The control device includes a power supply that generates a DC voltage from an input voltage communicated via a low voltage line by a power source. The control device also includes a receiver that extracts timing data from the input voltage and output circuitry that is operable to communicate information to the power source via the low voltage line.

17 Claims, 15 Drawing Sheets

U.S. PATENT DOCUMENTS

| | | |
|---|---|---|
| 2009/0175046 A1 | 7/2009 | Richard |
| 2009/0195063 A1 | 8/2009 | Joseph et al. |
| 2009/0195085 A1 | 8/2009 | Joseph |
| 2009/0195164 A1 | 8/2009 | Joseph |
| 2009/0195179 A1 | 8/2009 | Joseph et al. |
| 2009/0195192 A1 | 8/2009 | Joseph |
| 2009/0195193 A1 | 8/2009 | Joseph |

\* cited by examiner

SMART CONTROL DEVICE

RELATED APPLICATION

This application claims priority under 35 U.S.C. §119(e) to U.S. Provisional Patent Application No. 61/026,313 filed on Feb. 5, 2008, which is hereby incorporated by reference in its entirety.

BACKGROUND

Low voltage systems are used for powering a variety of devices. Such devices are placed in driveways, pathways, or grounds of homeowners or other residential or commercial properties. For example, low voltage outdoor lights or other electrical devices may be placed in a yard. Various low voltage systems include a power supply that provides a low voltage signal to power devices coupled to a low voltage line. Coupled devices are turned on or off when the power supply is turned on or off. For example, outdoor lights are turned on in the evening, but in the morning, the outdoor lights are turned off by shutting down the power supply.

BRIEF SUMMARY

In one aspect, a control device is provided. The control device includes an input device for communicating with a power supply. The input device receives a square wave signal from the power supply. The input device includes data in the square wave signal to be read by the power supply. The power supply outputs a modified square wave signal responsive to the included data to control a remote device.

Other systems, methods, features and advantages of the design will be, or will become, apparent to one with skill in the art upon examination of the following figures and detailed description. It is intended that all such additional systems, methods, features and advantages be included within this description.

BRIEF DESCRIPTION OF THE DRAWINGS

The components in the figures are not necessarily to scale, emphasis instead being placed upon illustrating the principles of the design. Moreover, in the figures, like referenced numerals designate corresponding parts throughout the different views.

DETAILED DESCRIPTION

Figure 1:
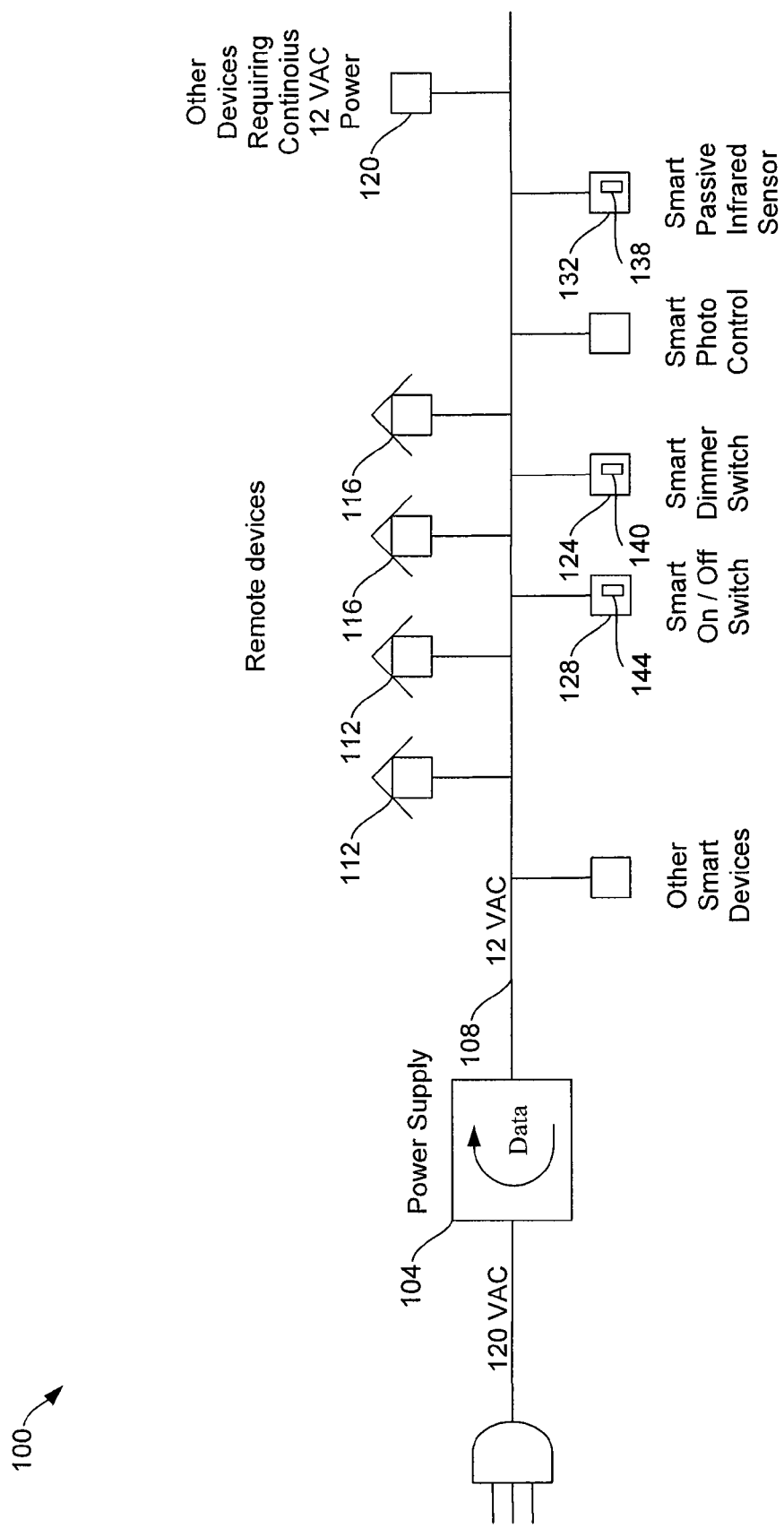
FIG. 1 is a perspective view of a low voltage system.

FIG. 1 is a perspective view of a system 100 that may utilize and include devices and methods described herein. The system 100 may be implemented in different ways, such as a security system, a fire protection and control system, an irrigation system, an HVAC system, an outdoor lighting system, or other low voltage system, and any combination thereof. For example, the system 100 is a low voltage outdoor lighting system that may be used residentially and/or commercially. The system 100 includes, but is not limited to, a power supply 104, a power supply line 108, remote devices 112, 116, and 120, and control devices 124, 128, and 132. Fewer, more, or different components or devices may be provided. The system 100 may be used to illuminate lights and/or control, power, or operate other remote devices. The lights and/or other remote devices may be placed in a garden area or may illuminate or operate near a driveway or pathway or other surroundings.

The power supply 104 is used to supply power to the remote devices via the power supply line 108. For example, the power supply 104 is a low voltage power supply that electrically connects with a standard wall outlet or other high voltage outlet that provides 90 to 132 alternating current volts ("VAC") RMS, such as 110 VAC at 60 Hz. The power supply 104 converts the 110 VAC to at most 15 VAC RMS, such as 12 VAC, to power the remote devices.

Figure 2:
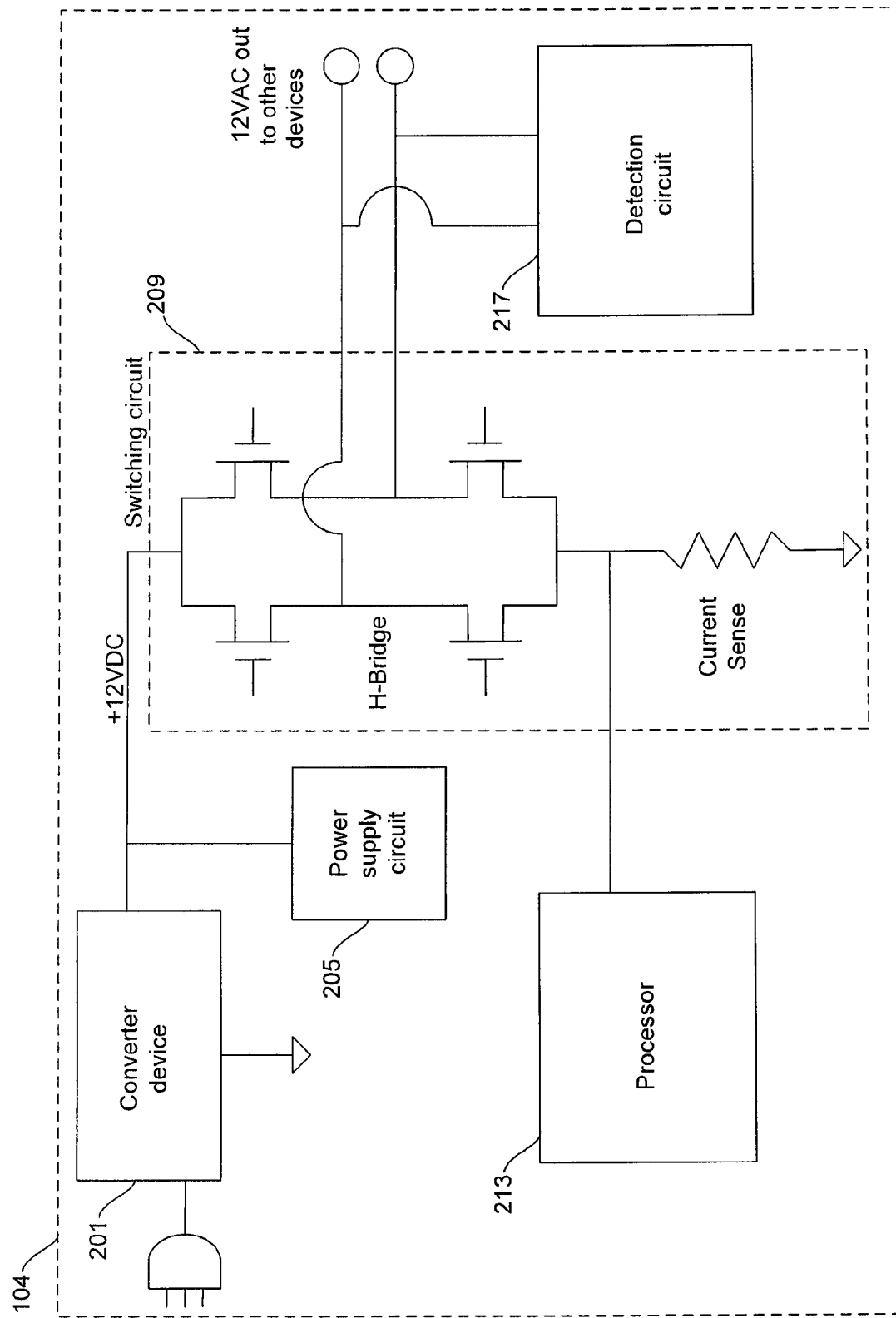
FIG. 2 is a block diagram illustrating components of a power supply of the low voltage system of FIG. 1.

FIG. 2 is a block diagram illustrating components of the power supply 104. The power supply includes, but is not limited to, a converter device 201, a power supply circuit 205, a switching circuit 209, a processor 213, and a detection circuit 217. Fewer, more, or different components may be provided. For example, the power supply 104 may also include a housing, switches, electrical connections, a power plug, outputs for one or more power supply lines, such as the power supply line 108, photocells, and/or timers.

The converter device 201 down-converts a voltage, such as 110 VAC, to a lower voltage direct current ("DC") voltage, such as 12 VDC. The converter device 201 includes a transformer, an inverter, a switching power supply, or another device for converting a high voltage to a lower voltage. The power supply circuit 205 is in communication with the converter device 201. The power supply circuit 205 converts the low voltage provided by the converter device 201 to a lower direct current voltage to power other components. For example, the power supply circuit converts the 12 VDC to substantially a 3.3 VDC. The power supply circuit 205 includes a linear regulator or another device for converting or down-converting DC voltage.

The switching circuit 209 is also in communication with the converter device 201. The switching circuit 209 uses the low voltage output of the converter device 201 to generate a square wave or a pulse signal. For example, the switching circuit 209 includes two half-bridge circuits that are switched on and off to generate a square wave or pulse signal. Alternatively, other switching circuits or transistors may be used. The timing of the switching determines the width or size of pulses or a cycle of a square wave.

The switching pattern or switching control is provided by the processor 213. The processor 213 is in communication with the switching circuit 209 and the detection circuit 217. The processor 213 may be in communication with more or fewer components. The processor 213 is a general processor, application-specific integrated circuit ("ASIC"), digital signal processor, field programmable gate array ("FPGA"), digital circuit, analog circuit, or combinations thereof. The processor 213 is one or more processors operable to control and/or communicate with the various electronics and logic of the power supply 104. The processor 213 sends one or more key sequences, bits, flags, or other signals to the switching circuit 209, which in response, switches the low voltage, such as 12 VDC, to generate a desired square wave or pulse signal that is transmitted on the power supply line 108.

The detection circuit 217 receives or senses data included or injected in or on the square wave or pulse signal, such as by a remote device, and provides one or more signals to the processor 213 based on detection of the included data. The processor 213 modifies the square wave or pulse signal based on the signals received from the detection circuit 217. For example, the processor 213 changes a switching pattern based on data received from the detection circuit 217. The processor 213 may include a look-up-table that correlates data to be received with timing or switching patterns. Alternatively, the correlation information may be stored in a memory in communication with the processor 213.

Figure 3:
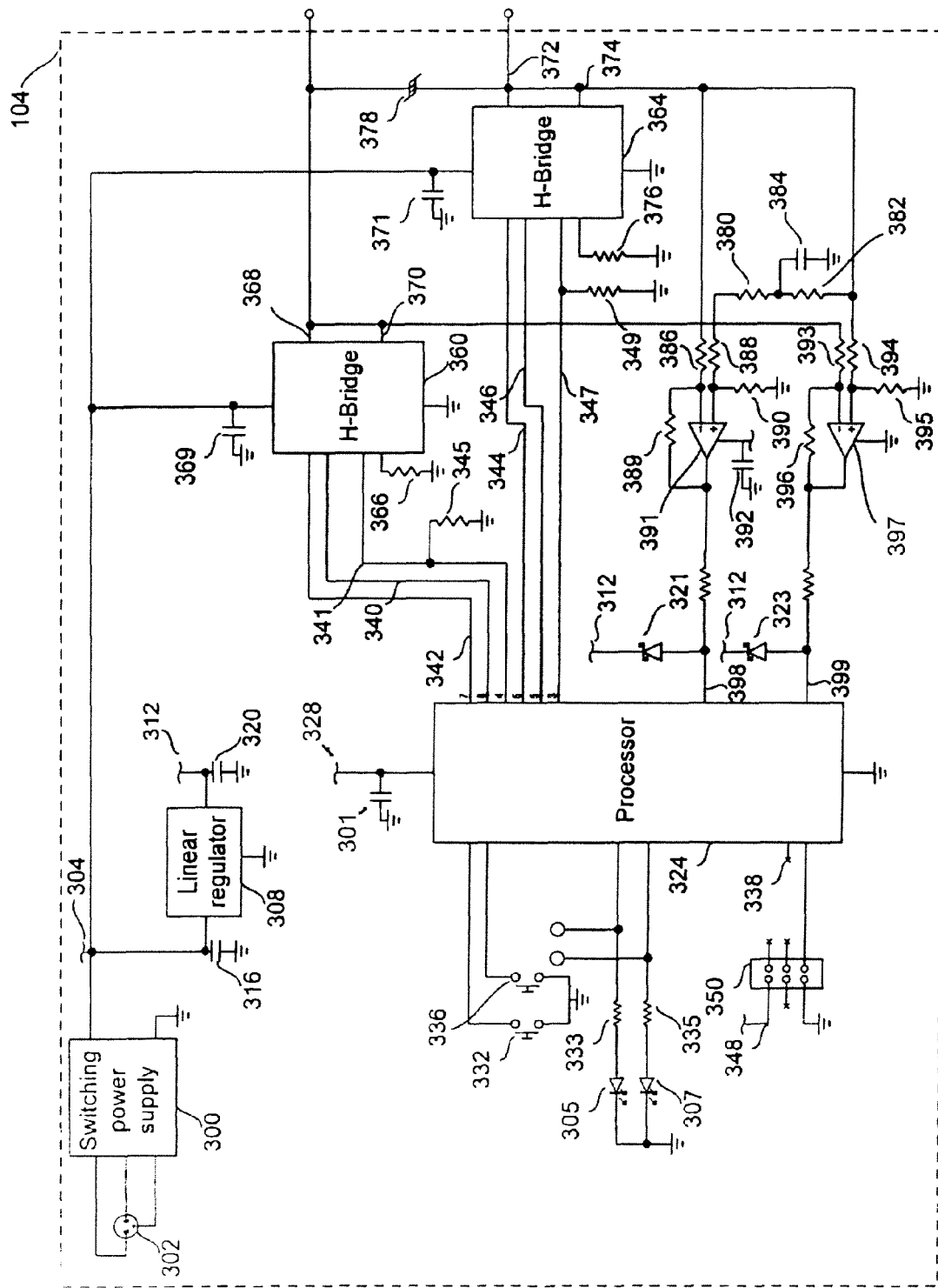
FIG. 3 is a circuit schematic of the power supply of FIG. 2.

FIG. 3 is a circuit schematic of the power supply 104. Fewer, more, or different components may be provided. A power plug or power source 302 that provides about 110 VAC is connected with a switching power supply 300. The switching power supply 300 converts the 110 VAC to a voltage 304. For example, the voltage 304 is 12 VDC. A linear regulator 308 converts the voltage 304 into a lower DC voltage 312. For example, the voltage 312 is about 3.3 VDC. The linear regulator 308 is biased by capacitor 316 and capacitor 320. The capacitors 316 and 320 have capacitances of about 47 µF. Alternatively, other capacitance values may be used. The voltage 312 may be used to provide voltage to other devices of the power supply 104.

A processor 324 provides signals to a half-bridge circuit 360 and a half-bridge circuit 364 via pins 340, 342, 344, and 346. The signals control switching of the half-bridge circuits to generate a square wave or a pulse signal. Pins 341 and 347 are used to sense current flowing through the respective half-bridge circuits 360 and 364. The current sense may be used as a safety or protection feature. The pins 341 and 347 are connected with resistors 345 and 349, which have a resistance of about 1 K Ohms. Alternatively, other resistance values may be used.

The processor 324 is powered by a voltage 328, which is the same as or different than the voltage 312, as well as a capacitor 301. The capacitor has a capacitance of about 0.1 µF. Alternatively, other capacitance values may be used. The processor 324 includes a reset pin 338 for resetting logic or power of the processor 324 as well as pins for communicating with buttons or switches 332 and 336. The switches 332 and 336 are used for altering or modifying the square wave or the pulse signal generated by the output signals of the processor that control the switching of the half-bridge circuits. For example, the switch 332 or 336 is a dimmer switch.

A connector 350 is operable to connect with the processor 324. The connector 350 is used to debug or program the processor 324. For example, the connector 350 is powered by a voltage 348, which is which is the same as or different than the voltage 312, and includes six pins. Fewer or more pins may be provided.

A resistor 333 and a light emitting diode ("LED") 305 are connected in series coupled with the processor 324, and a resistor 335 and a LED 307 are connected in series and coupled with the processor 324. The resistors 333 and 335 have a value of 1 K Ohms. Alternatively, other values may be used. The LEDs 305 and/or 307 are used as indication lights, which indicate whether the power supply is on or off, or may indicate an error or software and/or hardware problem.

The half-bridge circuit 360 is biased by a resistor 366 and a capacitor 369. The resistor 366 has a resistance of about 10 K Ohms, and the capacitor 369 has a capacitance of about 0.1 µF. Alternatively, other values may be used. The half-bridge circuit 360 provides an output 368 and an output 370. The outputs 368 and 370 are provided to the operational amplifiers 391 and 397, respectively. The output 368 is also provided to a power supply line, such as the power supply line 108.

The half-bridge circuit 364 is biased by a resistor 376 and a capacitor 371. The resistor 376 has a resistance of 10 K Ohms, and the capacitor 371 has a capacitance of about 0.1 µF. Alternatively, other values may be used. The half-bridge circuit 364 provides an output 372 and an output 374. The outputs 372 and 374 are connected with the operational amplifiers 391 and 397, respectively. The output 372 is also provided to the power supply line, such as the power supply line 108. A metal oxide varistor ("MOV") 378 is coupled between the outputs 368 and 372. The MOV 378 is used to protect or suppress over voltages that may develop or occur on the power supply line.

Signals received by the operational amplifiers 391 and 397 are referenced by a divider circuit including a resistor 380, a capacitor 384, and a resistor 382. The resistors 380 and 382 have a resistance of 50 Ohms, and the capacitor 384 has a capacitance value of 47 µF. Alternatively, other values may be used. The reference circuit biases input signals to an average voltage so that the signals do not have a similar voltage to the power supply of the operational amplifiers 391 and 397. For example, 12 volts is referenced to 6 volts to avoid saturation or other electrical complications.

The operational amplifier 391 is biased by a resistor 386, a resistor 388, a resistor 389, a resistor 390, and a capacitor 392. The resistors 386, 388, 389, and 390 have a resistance of 10 K Ohms each, and the capacitor 392 has a capacitance of 0.1 µF. Alternatively, other values may be used. The operational amplifier 397 is biased by a resistor 393, a resistor 394, a resistor 395, and a resistor 396. The resistors 393, 394, 395, and 396 have a resistance of 10 K Ohms each. Alternatively, other values may be used.

The operational amplifiers 391 and 397 act as a detection circuit. For example, the operational amplifiers 391 and 397 receive the square wave or pulse signal that is transmitted on the power supply line, such as the power supply line 108. When additional data is included on the square wave or pulse signal, such as from a control device, the operational amplifiers 391 and 397 sense the change of data or information based on the differential operation of the operational amplifiers 391 and 397 and provide signals to the processor 324.

The processor 324 uses pins or ports 398 and 399 to receive the signals from the operational amplifiers 391 and 397. The pins or ports 398 and 399 are associated with analog-to-digital converters (ADCs) that are used as comparators or detectors within the processor 324. The processor 324 determines a control command based on comparing or correlating a received signal with predetermined data. The processor 324 adjusts or modifies the output signals outputted from pins 340, 342, 344, and 346 to change the switching operation of the half-bridge circuits 360 and 364. The modified switching operation generates a modified square wave or pulse signal that is responsive to the additional data received by the operational amplifiers 391 and 397. Also, diodes 321 and 323, such as Schottky diodes, are used as protection circuits to limit a voltage inputted to the processor 324. Some or all of the diodes described herein may be Schottky diodes or other type of diodes.

Figure 4:
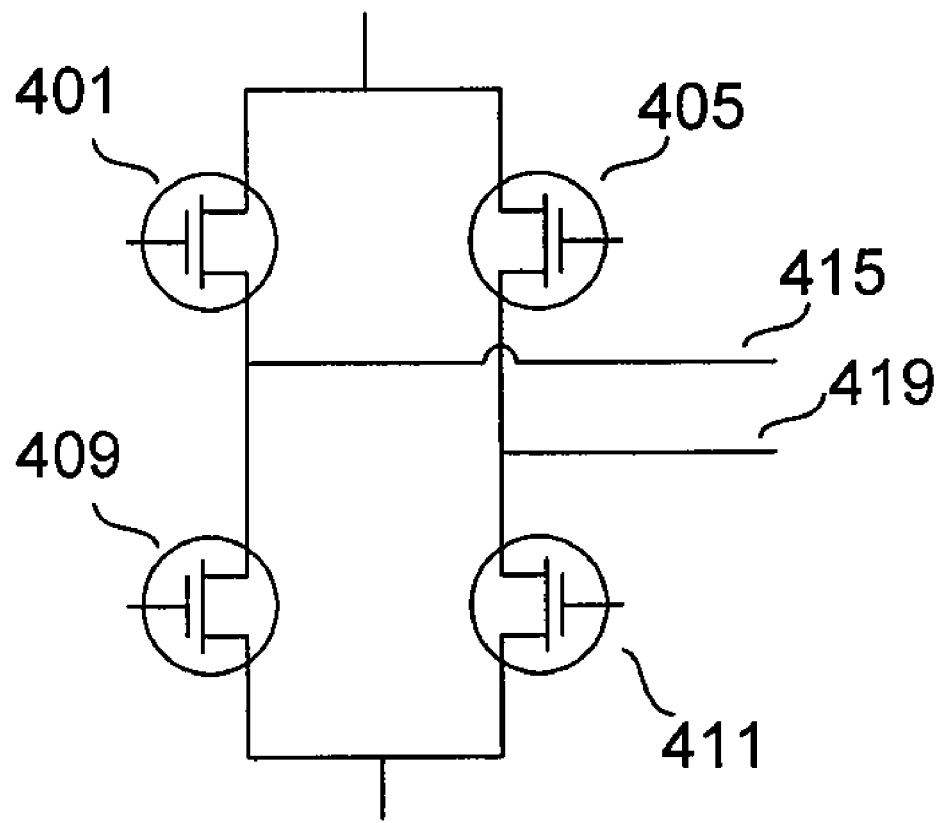
FIG. 4 is a circuit of a component of the power supply of FIG. 3.

FIG. 4 is a circuit configuration of a switching device, such as the switching circuit 209 or the half-bridge circuits 360 and 364. The circuit configuration includes a transistor 401, a transistor 409, a transistor 405, and a transistor 411. The transistors 401 and 409 are coupled in series, and the transistors 405 and 411 are coupled in series. The pair of the transistors 401 and 409 are in parallel with the pair of the transistors 405 and 411. For example, the transistors 401 and 409 correspond to the half-bridge circuit 360, and the transistors 405 and 411 correspond to the half-bridge circuit 364. An output 415 is coupled between the transistors 401 and 409, and an output 419 is coupled between the transistors 405 and 411. The outputs 415 and 419 connect with a power supply line, such as the power supply line 108.

The transistors 401, 409, 405, and 411 are MOSFETs, JFETs, PNP, NPN, or any other type of transistors. The transistors are used as switches in which each transistor allows a signal to pass through based on a voltage present on its gate or base. The switching signals provided by a processor, such as the processor 324 or 213, switch the transistors in a sequence so that a low voltage, such as the 12 VDC, is converted into a desired square wave or pulse signal.

Figure 5:
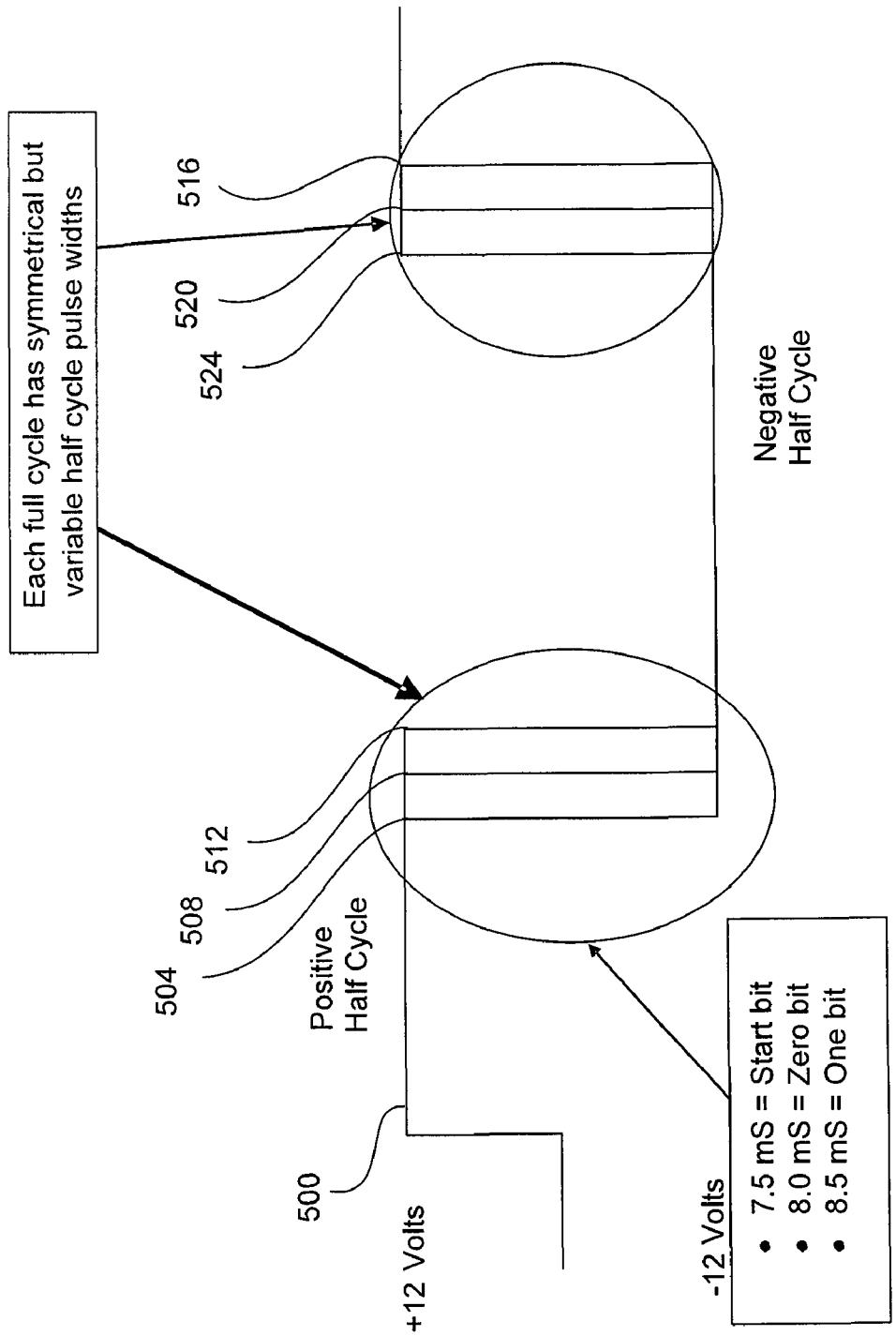
FIG. 5 is a signal provided by the power supply of the low voltage system of FIG. 1.

FIG. 5 shows a signal 500 provided by a power supply, such as the power supply 104. The signal 500 is a square wave or a pulse signal at a low voltage, such as 12 VAC. For example, the signal 500 is centered about a mean or substantially zero voltage and includes positive and negative swings or pulses. One cycle includes a positive 12 volts and a negative 12 volts. Alternatively, the signal 500 may be centered about a positive or negative voltage, and the maximum positive pulse may be at a different voltage than the maximum negative pulse, or vice versa.

The signal 500 can be modified by changing the width or size of a pulse or square wave cycle. For example, a processor, such as the processor 324 or 213, may alter signals or the timing of signals provided to a switching device, such as the switching circuit 209 or the half-bridge circuits 360 and 364. In this way, square waves or digital pulse signals with different pulse widths may be generated. For example, a pulse may have a width 504, which corresponds to a pulse of 7.5 ms. The pulse may also have a width 508, which corresponds to a pulse of 8.0 ms, and a width 512, which corresponds to a pulse of 8.5 ms. Alternatively, increments other than 0.5 ms may be used for different widths.

The different widths correspond to a digital encoding that is used to communicate with devices, such as the remote devices connected with the power supply line. For example, the pulse width of 7.5 ms may correspond to a start bit, the pulse width of 8.0 ms may correspond to a zero bit, and the pulse width of 8.5 ms may correspond to a one bit. The signal 500 is used to power a remote device and control the remote device via a sequence of bits. Alternatively, other signals other than a square wave may be used and encoded in a different manner. For example, frequency shifting over cycles of a sinusoidal wave may be used to correlate to different bits. Or, Manchester coding may be used.

A bit corresponds to half a cycle, a full cycle, or two symmetrical half cycles. For example, the widths 504, 508, and 512 correspond to a half cycle, and widths 516, 520, and 524 correspond to a symmetrical half cycle. The width 516 is the same as the width 504, the width 520 is the same as the width 508, and the width 524 is the same as the width 512. A bit corresponds to the two symmetrical half cycles. Therefore, for example, if a bit were to be set to zero, the widths 508 and 520 would be used to represent a zero bit.

Figure 6:
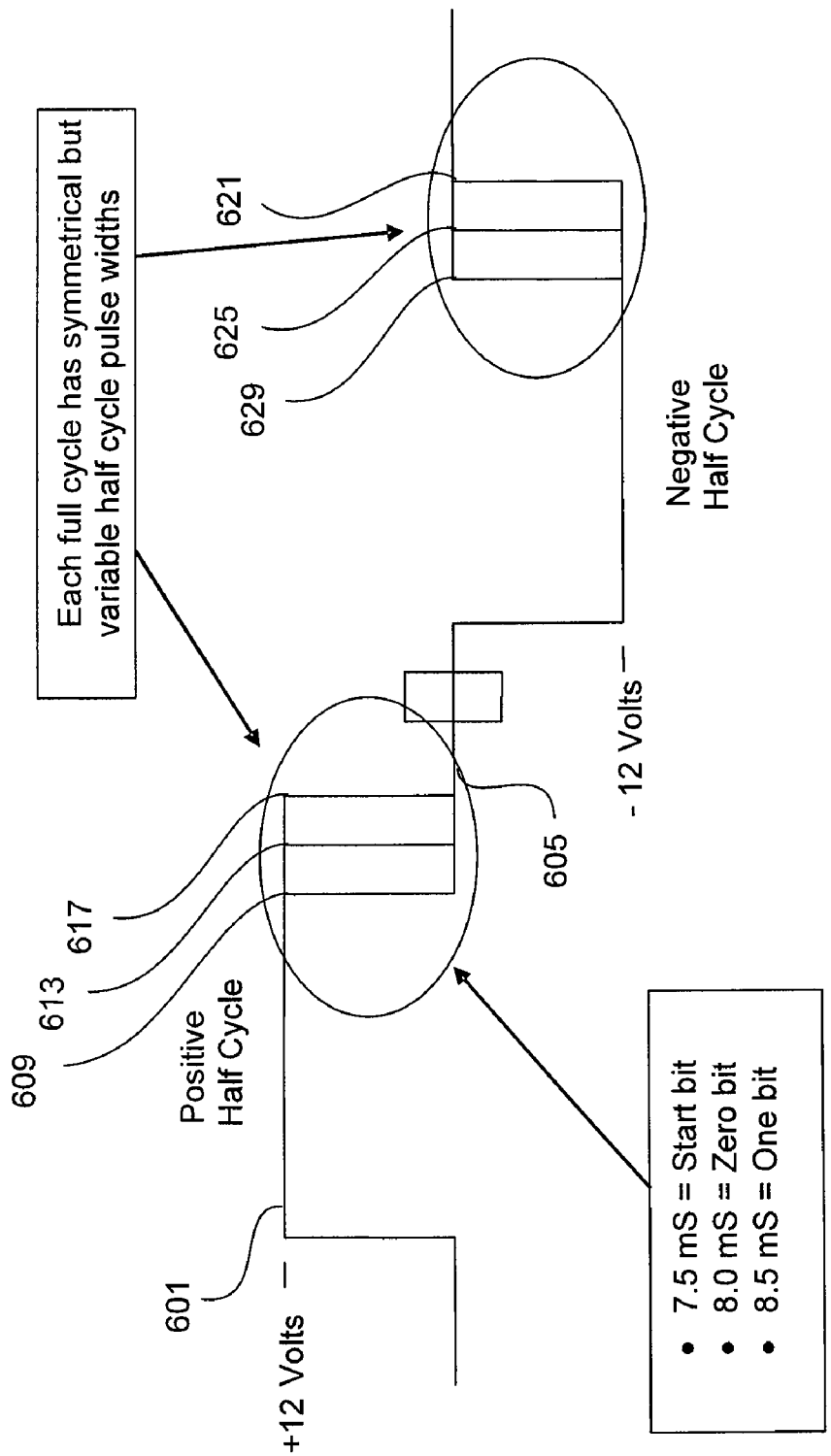
FIG. 6 is an alternate signal provided by the power supply of the low voltage system of FIG. 1.

FIG. 6 shows an alternate signal 601 provided by a power supply, such as the power supply 104. The signal 601 is a square wave or a pulse signal, such as at 12 VAC. The signal 601 includes a platform 605 making the signal 601 a step signal. The platform is about 250 μs. Different pulse widths are used to indicate different bits, such as the signal 500. Widths 609, 613, and 617 correspond to a top portion of a half cycle, and widths 621, 625, and 629 correspond to a bottom portion of a symmetrical half cycle. The widths 609 and 621 correspond to a bottom or top portion of a step pulse of 7.5 ms, the widths 613 and 625 correspond to a bottom or top portion of a step pulse of 8.0 ms, and the widths 617 and 629 correspond to a bottom or top portion of a step pulse of 8.5 ms.

Figure 7:
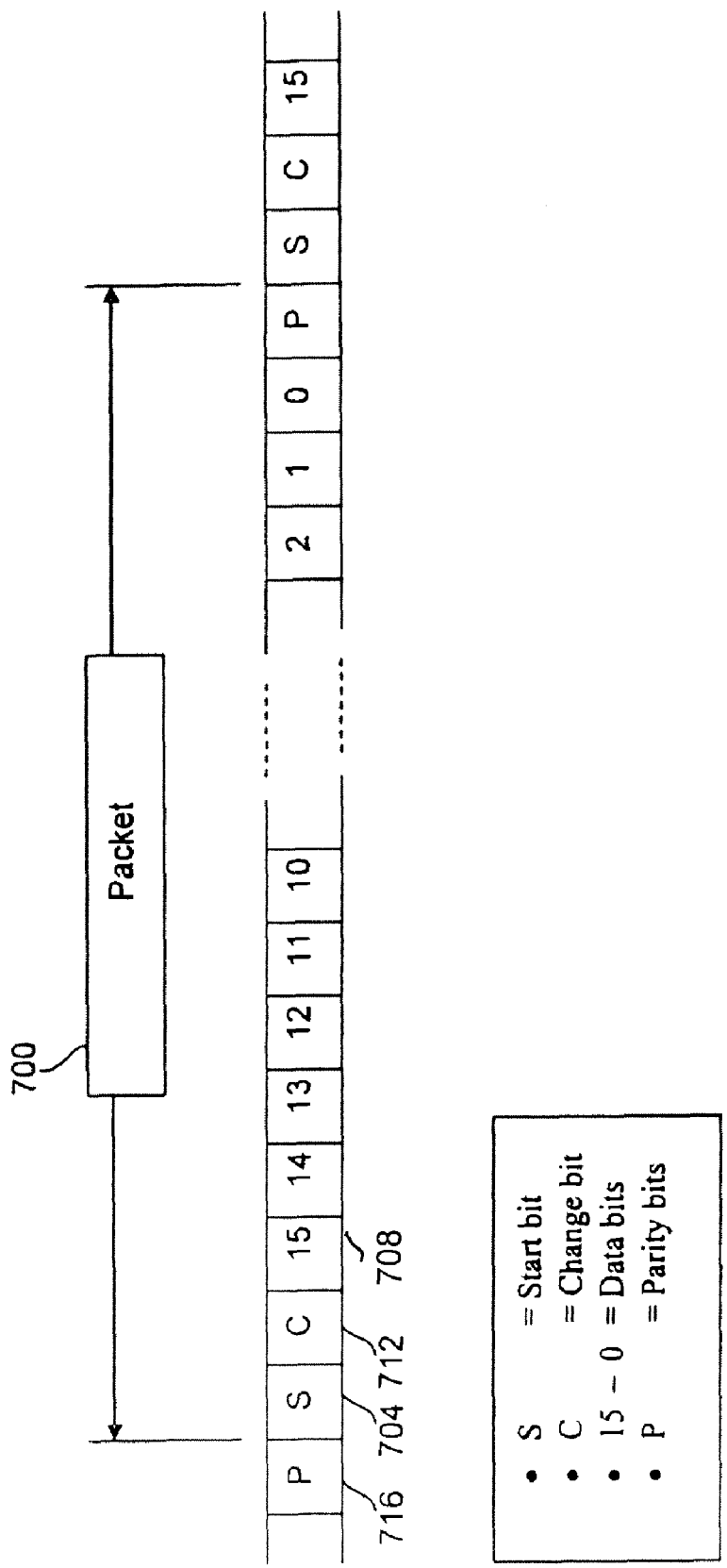
FIG. 7 is a data sequence corresponding to the signals of FIG. 5 or 6.

FIG. 7 shows a data sequence corresponding to the signal 500 or 601. The data sequence includes a plurality of packets 700. For example, one packet 700 includes 19 bits. The packets 700 are between about ⅓ of a second in duration. The packet 700 includes data bits 708, a start bit 704, a change bit 712, and a parity bit 716. Fewer, more, or different bits may be used. Packets 700 are sent continuously, repeating about every ⅓ of a second.

Sixteen data bits 708 are used to control remote devices. For example, 8 data bits 708 correspond to the remote devices 112 and the other 8 data bits 708 correspond to the remote device 116. Different bit sequences for each group of data bits 708 can be used to control the remote devices, such as commanding the remote devices to turn on or off. For example, a first byte, bit 15 to bit 8, corresponds to a first group of remote devices, and a second byte, bit 7 to bit 0, corresponds to a second group of remote devices. Each byte may be assigned an output or intensity level control. For example, 000 equals a full off state, and 127 equals a full on state. Intermediate bytes may correspond to different output levels, such as brightness levels of a light. Other byte assignments may be used for other controls.

The start bit 704 is used as a header or a marker to synchronize down stream remote devices. The change bit 712 is used to indicate that the data in the current packet is different from the previous packet. The parity bit 716 is implemented as even or odd parity covering all bits in the packet 700 except the start bit 704. If there is a packet parity error in a received packet, the remote device ignores the current packet and uses data from the previous packet. Additionally, as packets are repeated about every ⅓ of a second, a data error that may pass a parity check would clear itself out during the next packet. For example, the error would persist for about only about ⅓ second and may not continue.

Referring back to FIG. 1, the remote devices 112 and 116 are any devices that can be powered by the power supply 104 via the power supply line 108. For example, the remote devices 112 are one group of lights, such as outdoor lights that connect with the power supply line 108, and the remote devices 116 are another group of lights, such as outdoor lights, that connect with the power supply line 108. The lights of either group include a housing for supporting a light source. The housing has a lantern or cone shape. Alternatively, the housing may have any other geometrical shape. Clear or colored glass or plastic may be used to illuminate surroundings in a variety of colors. The lights may also have a stand or support that is buried under the ground or is placed on top of the ground to keep the lights in an upright position. The remote devices 112 and 116 connect with the power supply line 108 using a connector. The connector has two pins that penetrate a cover of the power supply line 108 and electrically connect with internal conductors. Alternatively, other connectors may be used.

The remote device 120 may also be powered by the power supply line 108 via a connector. The remote device 120 is a low power strip, fan, radio, light, or other device that is powered by a low voltage, such as 12 VAC. The remote device 120 may be a device that typically operates during the day while lights are turned off. For example, the remote device 120 is a radio that one can listen to during the day while working in his or her yard. Therefore, the power supply 104 is able to power the remote device 120 while turning off lights or other remote devices, such as the remote devices 112 or 116, by using the encoded square wave or pulse signal previously mentioned.

Alternatively, additional lines, wires, or cables may be used to separately supply power and control the remote devices. For example, the power supply 104 may be able generate an encoded signal, as described above, and control remote devices by transmitting the encoded signal on one or more lines that are separate from a power supply line that powers the remote devices.

Figure 8:
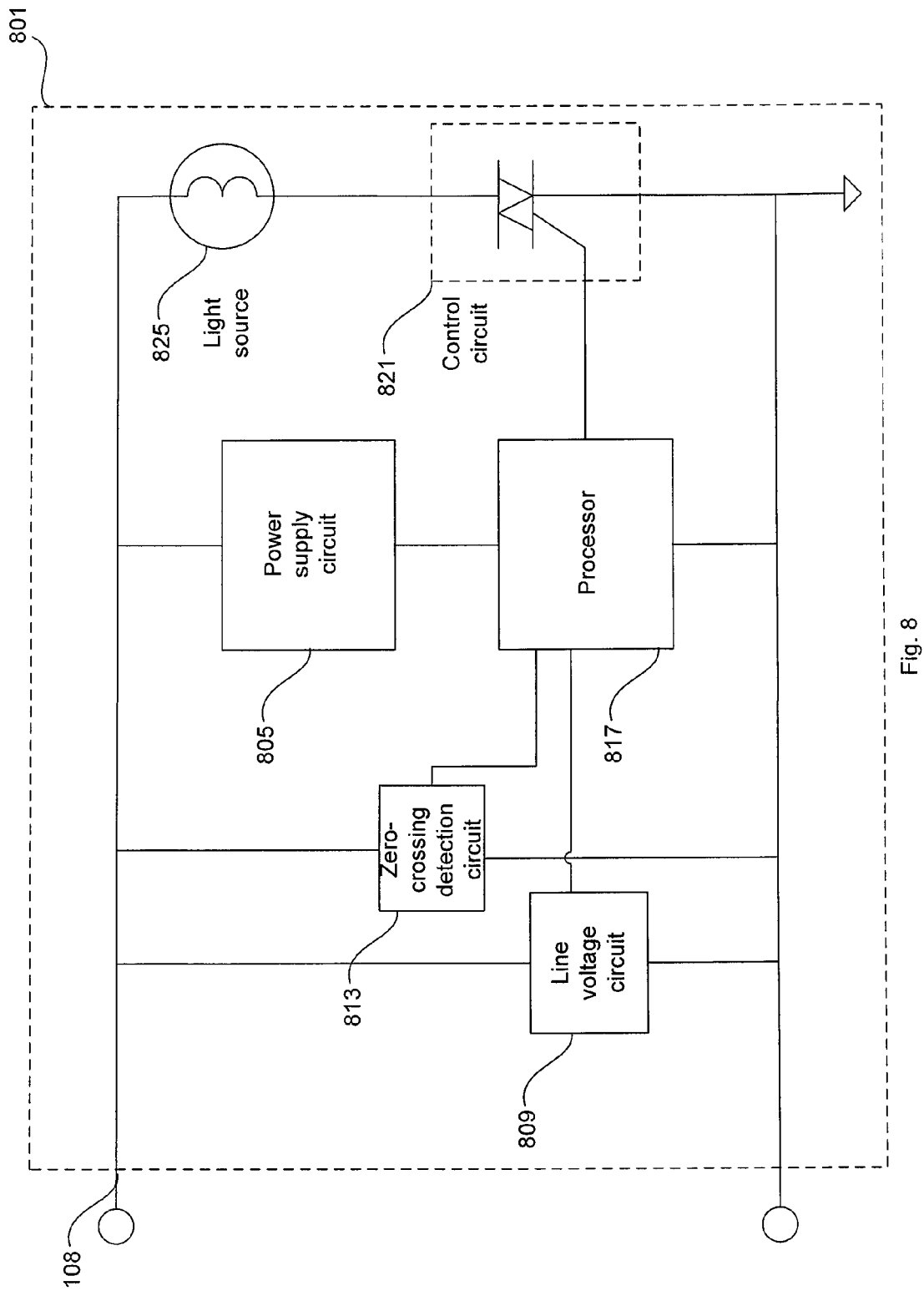
FIG. 8 is a block diagram illustrating components of a remote device of the low voltage system of FIG. 1.

FIG. 8 is a block diagram illustrating components of a remote device 801, such as the remote device 112 and/or 116. For example, the remote device 801 is a lighting device that connects with the power supply line 108. The remote device 801 includes, but is not limited to, a power supply circuit 805, a line voltage circuit 809, a zero-crossing detection circuit 813, a processor 817, a control circuit 821, and a light source 825. Fewer, more, or different components may be provided. For example, the remote device 801 may include a housing or fixture components that may enclose or support the circuitry.

The power supply circuit 805 includes a linear regulator or other device that converts or down-converts a voltage. The power supply circuit 805 converts the alternating low voltage provided by the power supply line 108 to a lower direct current voltage ("VDC") to power other components. For example, the power supply circuit 805 converts the 12 volts of the square wave or pulse signal to substantially a 3.3 VDC. The line voltage circuit 809 provides a voltage or current to the processor 817 in which the voltage or current corresponds to a line voltage of the power supply line 108 where the remote device 801 is located at. The line voltage circuit 809 includes passive components, such as resistors, inductors, and/or capacitors. The line voltage circuit 809 may also include active components used to convert a voltage on the power supply line 108 to a suitable voltage or current for the processor 817. Alternatively, the line voltage circuit 809 may connect with the power supply circuit 805.

The zero-crossing detection circuit 813 is in communication with the power supply line 108. The zero-crossing detection circuit 813 detects or senses when the 12 volts square wave or pulse signal crosses a substantially zero or mean voltage. The zero-crossing detection circuit 813 provides a signal or lack of a signal to the processor 817 for all or some of the crossings. The zero-crossing detection circuit 813 includes diodes, one or more transistors, resistors, and/or a capacitor.

The processor 817 controls the operation of the light source 825 by a control circuit 821. The processor 817 is a general processor, application-specific integrated circuit ("ASIC"), digital signal processor, field programmable gate array ("FPGA"), digital circuit, analog circuit, or combinations thereof. The processor 817 is one or more processors operable to control and/or communicate with the various electronics and logic of the remote device 801. For example, the processor 817 controls the operation of the light source as a function of data, bits, or commands encoded in the square wave or pulse signal on the power supply line 108. Because different bits correspond to different pulse widths, the processor determines a command by reading bit sequences via the zero-crossing detection circuit 813.

The processor 817 outputs one or more signals to the control circuit 821 to control the operation of the light source 825. For example, the control circuit 821 includes a switch that turns on and off in response to the signal or lack of the signal from the processor 817. The switch may be one or more TRIACs, transistors, relays, or other electrical devices that can operate as a switch. The control circuit 821 may also include drivers or other components to operate a switch. The switching of the control circuit 821 electrically disconnects and connects the light source 825 from the power supply line 108. Alternatively, the switch can connect and disconnect the light source 825 from ground. For example, the light source 825 is turned constantly on or constantly off.

Alternatively, the brightness level of the light source 825 can be dimmed or increased. For example, the processor 817 outputs a pulse width modulated signal or a phase control signal to intermittently switch the light source 825 on and off via the control circuit 821. Increasing a duty cycle or frequency of the signal outputted from the processor 817 increases a brightness level of the light source. Decreasing a duty cycle or frequency of the signal outputted from the processor 817 decreases a brightness level of the light source. Because the power supply line 108 provides an alternating square wave or pulse signal to power the light source 825, switching operation of the control circuit 821 is synchronized with the rise and fall of the alternating square wave or pulse signal to appropriately switch the light source 825 on and off.

The encoded data in the power supply signal may command the processor 817 to set and/or maintain a desired brightness level. Also, the processor 817 may initially turn of the light source 825 using a soft start. For example, a duty cycle is gradually increased from zero to a desired percentage over a few seconds. This may extend the life of the light source 825.

The line voltage circuit 809 may be used to set a desired duty cycle or frequency of the signal outputted by the processor 817. For example, the processor 817 includes a look-up-table or other correlation information that correlates a voltage received by the line voltage circuit 809 with an estimated or measured voltage on the power supply line 108 where the remote device 801 is connected at. If the processor 817 determines that the line voltage is low, the processor 817 may increase the duty cycle or frequency of the output signal to increase a brightness level of the light source 825.

Because the power signal (the square wave signal or the pulse signal) includes varying pulse widths, a flickering phenomenon may occur when dimming the light source using pulse width modulated or phase control signal. To compensate for the varying pulse widths, the processor 817 may generate pulses of the pulse width modulated or phase control signal that are synchronized with the different widths of the power signal.

Because data streams encoded in the power supply signal are highly repetitive, each bit width may be predicted. Based on a known bit width (W) of the power supply signal and a desired output intensity (I), an ideal bit width (P) of the pulse width modulated or phase control signal may be calculated (e.g., $P = I*W$). By adjusting the pulse width modulated or phase control signal, the synchronized timing of intermittently turning the light source on and off substantially reduces flickering.

The light source 825 is one or more light emitting diodes ("LEDs"), incandescent lights, or other device that emits light. For example, the light source 825 may include a plurality of LEDs or one incandescent light bulb rated at 50 watts. Other bulb ratings may be used. The light source 825 may be a conventional or a custom light bulb or LED. The light source 825 emits light through a plastic, glass, air, or other medium to illuminate surroundings. Different colors can be illuminated by using a different colored mediums or housings. Alternatively, the light source 825 may emit different colors as a function of different applied currents, voltages, and/or signals.

Figure 9:
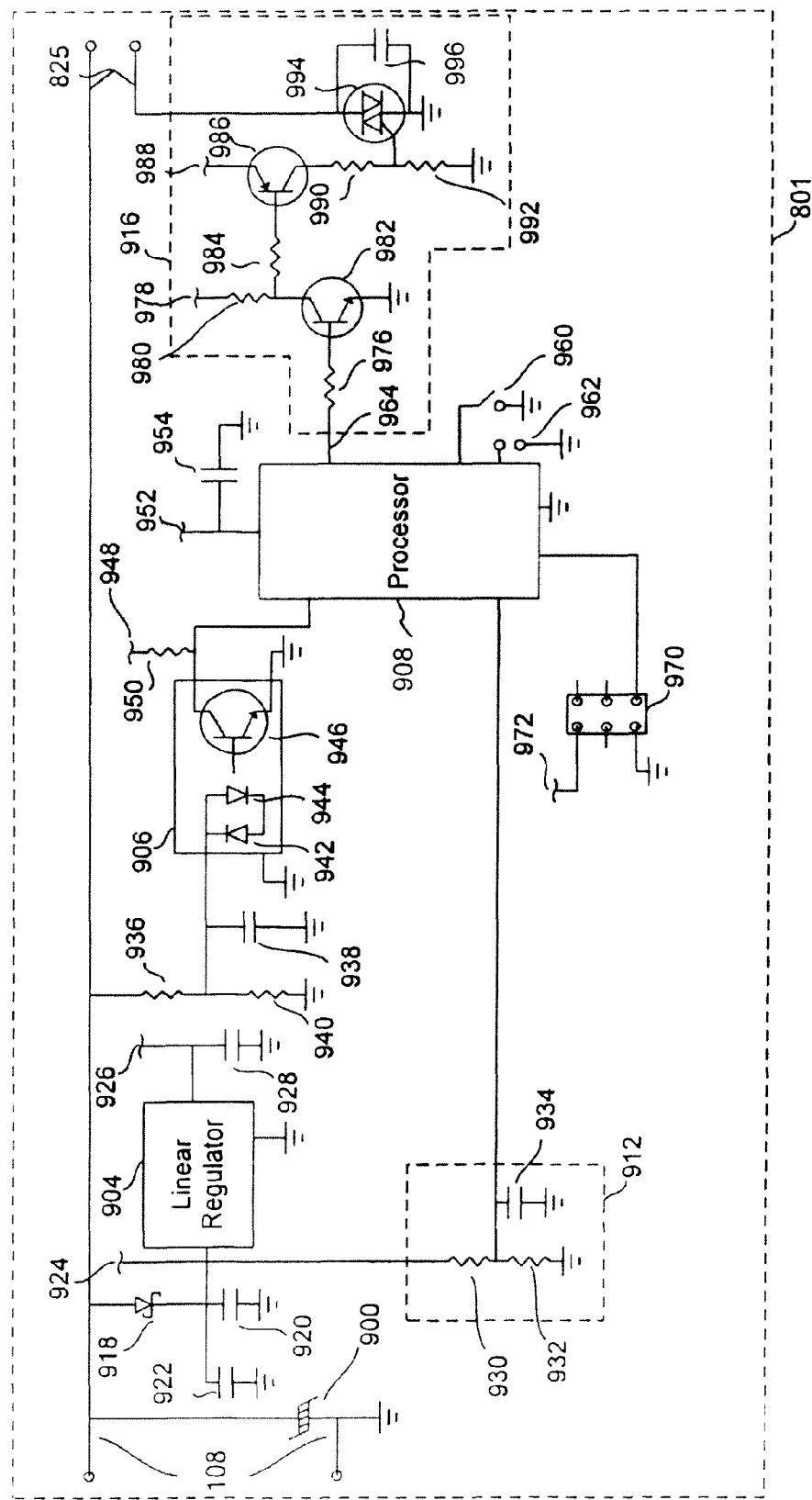
FIG. 9 is a circuit schematic of the remote device of FIG. 8.

FIG. 9 is a circuit schematic of the remote device 801. Fewer, more, or different components may be provided. A MOV 900 is connected across the power supply line 108. The MOV 900 is used to protect from or suppress over voltages that may develop or occur on the power supply line 108. Alternatively, other over voltage suppression devices, such as a thyristor or zener diode, may be used.

A diode 918 and capacitors 920 and 922 are used to rectify and provide a DC voltage 924. The voltage 924 is about 12 VDC. The capacitors 920 and 922 have a capacitance of about 47 μF. Alternatively, other capacitance values may be used. A linear regulator 904 converts the voltage 924 into a lower DC voltage 926. For example, the voltage 926 is about 3.3 VDC. The linear regulator 904 is biased by capacitor 928. The capacitor 928 has a capacitance of about 47 μF. Alternatively, other capacitance values may be used. The voltage 926 may be used to provide voltage to other devices of the remote device 801.

The voltage 924 is provided to a line voltage circuit 912, such as the line voltage circuit 809. The line voltage circuit 912 includes a resistor 930, a resistor 932, and a capacitor 934. The line voltage circuit 912 acts as a voltage divider to provide a voltage to the processor 908 that corresponds to a voltage on the power supply line 108 where the remote device 108 is connected. The resistors 930 and 932 have a resistance of 3.3 k ohms and 1 k ohms respectively, and the capacitor 934 has a capacitance of about 0.1 μF. Alternatively, other values may be used.

A zero-crossing detection circuit 906 is coupled with the power supply line 108 via a capacitor 938 and a voltage divider including a resistor 936 and a resistor 940. The resistors 936 and 940 have a resistance of about 3.3 K Ohms and 1 K Ohms, respectively, and the capacitor 938 has a capacitance of about 0.1 μF. Alternatively, other values may be used. The voltage divider and capacitor 938 provide a voltage to diodes 942 and 944 that switch a transistor 946 on or off based on a zero or mean crossing of the square wave or pulse signal on the power supply line 108. The transistor 946 is a photo-transistor, MOSFET, JFET, PNP, NPN, or other transistor.

For example, the diodes 942 and 944 are photo-diodes and/or LEDs that do not emit light when a zero or mean crossing occurs, and the transistor 946 is a photo-transistor that releases a signal to supply voltage 948 when there is a zero or mean crossing. Therefore, the processor 908 recognizes a zero or mean crossing when the supply voltage 948 is applied from an input to the processor 908. The voltage 948 is connected with the zero-crossing circuit 906 and the processor 908 via a pull-up resistor 950. The voltage 948 is the same as the voltage 926. The resistor 950 has a resistance value of about 1 K Ohms. Alternatively, other resistance values may be used. Different pulse widths of the square wave or pulse signal correspond to different bits. The processor 908 determines a command by reading bit sequences encoded in the square wave or digital pulse signal, as previously mentioned, based on the zero-crossings.

The processor 908 is similar to the processor 817. The processor 908 is powered by the voltage 952 and a supply capacitor 954. The voltage 952 is the same as the voltage 926 or 924. The capacitor 954 has a capacitance of about 0.1 μF. Alternatively, other capacitance values may be used. The processor 908 is operable to connect with a connector 970. The connector 970 is used to debug or program the processor 970. For example, the connector 970 is powered by a voltage 972, which is the same as or different than the voltage 926, and includes six pins. Fewer or more pins may be provided.

A switch 960 and a connector 962 may also couple with the processor 908. The switch 960 is used to manually turn on or off or control the remote device 801. The switch 960 may also be used to select a group for the remote device 801 to be a part of. For example, the switch 960 is a single or multi-pole switch or other switch supported by a housing of the remote device 801. A switch position of the switch 960 may command the processor to operate the components of the remote device, such as the control circuit 916 or the light source 825 in a predetermined manner. The connector 962 may be used to further send signals to the processor for a desired action. For example, the connector 962 is a jumper or other connection to change a mode or other feature of the processor 306.

The processor 908 is operable to send one or more control signals to the control circuit 916 via a pin or port 964. Other pins or ports may be used to communicate with the control circuit 916. The control circuit 916 is similar to the control circuit 821.

For example, the control circuit 916 includes a transistor 982 and a transistor 986, which are connected with voltages 978 and 988, respectively. The voltages 978 and 988 are at a same voltage as the voltage 924. The transistors 982 and 986 act as a voltage and/or current amplifier to provide current or voltage to a TRIAC 994. The transistors 982 and 986 are MOSFET, JFET, PNP, NPN, or other transistors. The transistors 982 and 986 are biased by resistors 976, 980, and 984. An output of the transistor 986 is connected with the TRIAC 994 via a voltage divider including resistors 990 and 992. The signal from pin 964, which may be a pulse modulated signal or phase or frequency control signal, is amplified by the transistors 982 and 986 and switches the TRIAC 994 on and off to effectively set or adjust an output or brightness level of the light source 825.

The TRIAC 994 is biased by a capacitor 996. The resistors 976, 980, 984, and 992 have a resistance value of 10 K Ohms each, the resistor 990 has a resistance value of 330 Ohms, and the capacitor 996 has a capacitance of 0.1 μF. Alternatively, other values may be used. The switching operation of the control circuit 916 is able to turn the light source 225 on or off or change a brightness level of the light source 225, as previously mentioned. Alternatively, a rectifier circuit may be used to reduce components in the control circuit 916 or other components, such as a driver circuit, may be used as described in U.S. provisional application No. 61/026,277, filed on Feb. 5, 2008, and also U.S. application Ser. No. 12/334,672 filed on even date herewith, both of which are entitled "INTELLIGENT LIGHT FOR CONTROLLING LIGHTING LEVEL," and are both hereby incorporated by reference.

Also, a heat sink 990 or other device or structure configured to dissipate or direct heat away from circuitry may be provided in the remote device 801.

Referring back to FIG. 1, the control or input devices 124, 128, and/or 132 (hereinafter referred to as "control devices") are used to control or modify the data or bit sequences encoded in the square wave or pulse signal, which, in turn, controls the operation of remote devices, such as the remote devices 112 or 116. The control devices 124, 128, and 132 connect with the power supply line 108 via a connector that has two pins that penetrate the cover of the power supply line 108 and connect with internal conductors, similar to the connections of the remote devices. Alternatively, other connectors may be used. For example, the control devices 124, 128, and 132 may wirelessly communicate with the power supply 104 and/or the power supply line 108 to modify or control the square wave or pulse signal.

The control devices 124, 128, and 132 include a housing. The housings have a rectangular or square shape. A length and width of the housings are less than about 5 inches, and a height of the housings are less than about 2 inches. Alternatively, the housings may have other geometrical shapes and dimensions. The housings support one or more inputs or receiving devices. For example, the control device 124 includes a dimmer switch 140, the control device 128 includes a on/off switch 144, and the control device 132 includes a sensor 148. The sensor 148 is a motion sensor, an infrared ("IR") sensor, a photo sensor, and/or other sensor. Other inputs or receiving devices may be used, such as a voice recognition circuit, a track ball, hardware or software buttons, or electro-static pad.

Activations of the inputs or receiving devices, such as the dimmer switch 140, the on/off switch 144, and the sensor 148, control or impact the operation of remote devices. Some control devices correspond to controlling one or more or a group of remote devices. One control device may be specific to one more remote devices. For example, the control device 128 may correspond to the remote devices 116. Switching the switch 144 to an off state commands the power supply 104 to alter the data bits of the square wave or pulse signal to correspond to an off command allocated for the remote devices 116. Therefore, the remote devices 116 may be turned off while other remote devices are still operating. Similarly, motion or light can be sensed to turn a remote device, such as a light, on or off. Also, lights can be dimmed using a control device.

Figure 10:
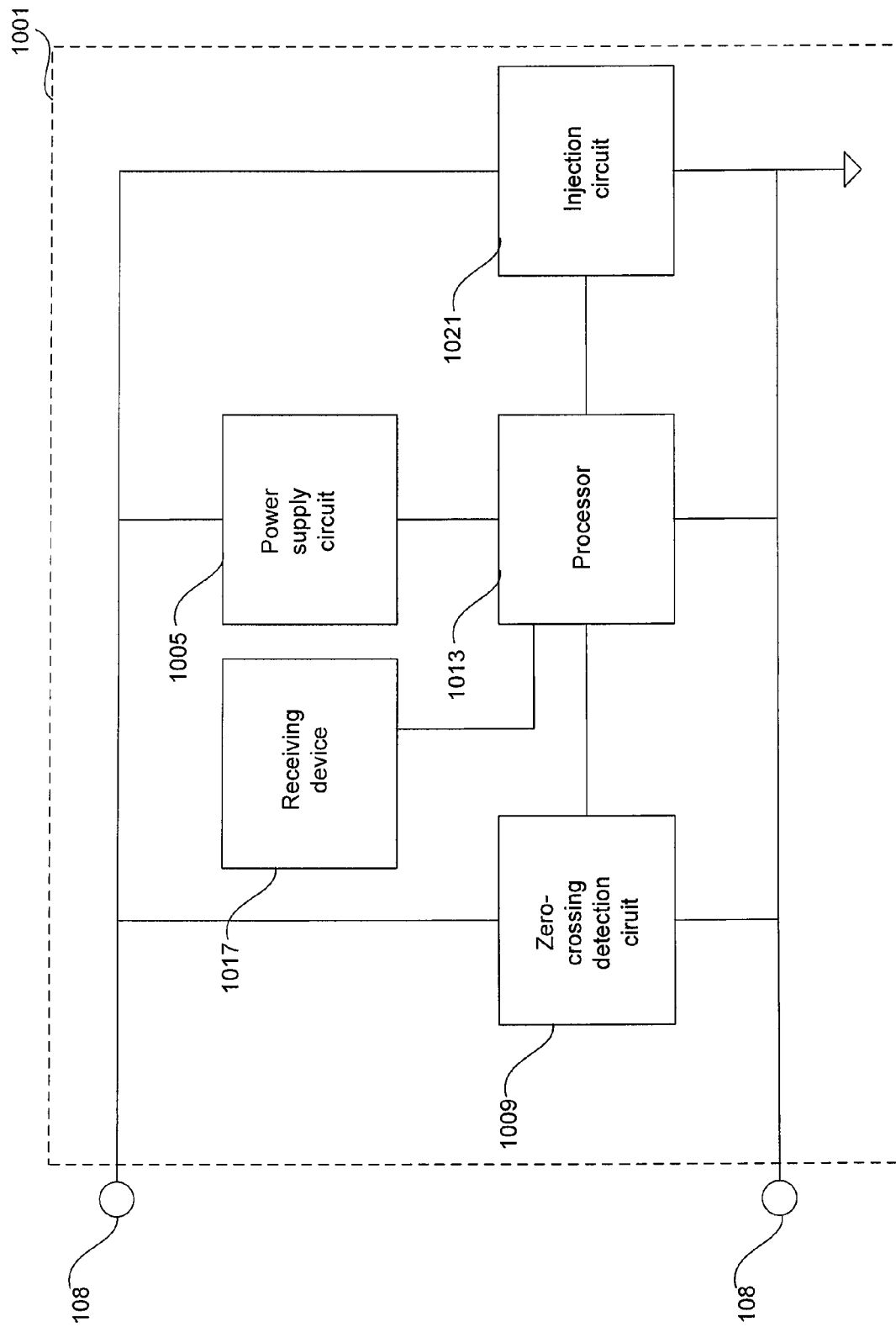
FIG. 10 is a block diagram illustrating components of a control device of the low voltage system of FIG. 1.

FIG. 10 is a block diagram illustrating components of a control device 1001, such as the control device 124, 128, and/or 132. The control device 1001 includes, but is not limited to, a power supply circuit 1005, a zero-crossing detection circuit 1009, a processor 1013, a receiving device 1017, and an injection circuit 1021. Fewer, more, or different components may be provided.

The power supply circuit 1005 includes a linear regulator or other device that converts or down-converts a voltage. The power supply circuit 1005 converts the alternating low voltage provided by the power supply line 108 to a lower direct current voltage ("VDC") to power other components. For example, the power supply circuit 1005 converts the 12 volts of the square wave or pulse signal to substantially a 3.3 VDC.

The zero-crossing detection circuit 1009 is in communication with the power supply line 108. The zero-crossing detection circuit 1009 detects or senses when the 12 volts square wave or pulse signal crosses a substantially zero or mean voltage. The zero-crossing detection circuit 1009 provides a signal or lack of a signal to the processor 1013 for all or some of the crossings. The zero-crossing detection circuit 1013 includes diodes, one or more transistors, resistors, and/or a capacitor.

The processor 1013 controls the injection circuit 1021 to modify or alter the square wave or pulse signal on the power supply line 108, such as the square wave 500 or 601. The processor 1013 is a general processor, application-specific integrated circuit ("ASIC"), digital signal processor, field programmable gate array ("FPGA"), digital circuit, analog circuit, or combinations thereof. The processor 1013 is one or more processors operable to control and/or communicate with the various electronics and logic of the control device 1001.

The receiving device 1017 is in communication with the processor 1013. The receiving device 1017 is a sensor, such as a photo, IR, and/or motion sensor, an on/off switch or button, dimmer switch or button, or other device configured to receive an input. The receiving device 1017 sends or transmits one or more signals to the processor 1013 when an input is received. For example, if light or motion is detected by a sensor, the sensor will send one or more signals to the processor 1013 that is indicative of sensed motion or light. Similarly, if a switch is turned on or off or set at a specific level, like a dimmer switch, one or more signals are sent to the processor 1013 corresponding to the received input. The processor 1013 may include a look-up-table or other correlation information to correlate signals corresponding to received input and a desired action.

The processor 1013 outputs one or more signals to the injection circuit 1021 as a function of the receiving device 1017 to inject or include data or control bits in the square wave or pulse signal. For example, the injection circuit 1021 includes one or more switches to generate a pulse or signal corresponding to a data bit. The generated pulse is included in the square wave or pulse signal on the power supply line 108. The zero-crossing detection circuit 1009 is used by the processor 1013 to timely control the injection circuit 1021 to include data in allocated areas or parts of the square wave or pulse signal. The power supply 104 reads or processes the included data or control bits, and modifies or alters the square wave or pulse signal based on the included data. For example, the power supply 104 may reduce one or more pulse widths of the square wave or pulse signal to communicate a command to one or more remote devices to shut or turn off as a function of an input received by the receiving device 1017.

Figure 11:
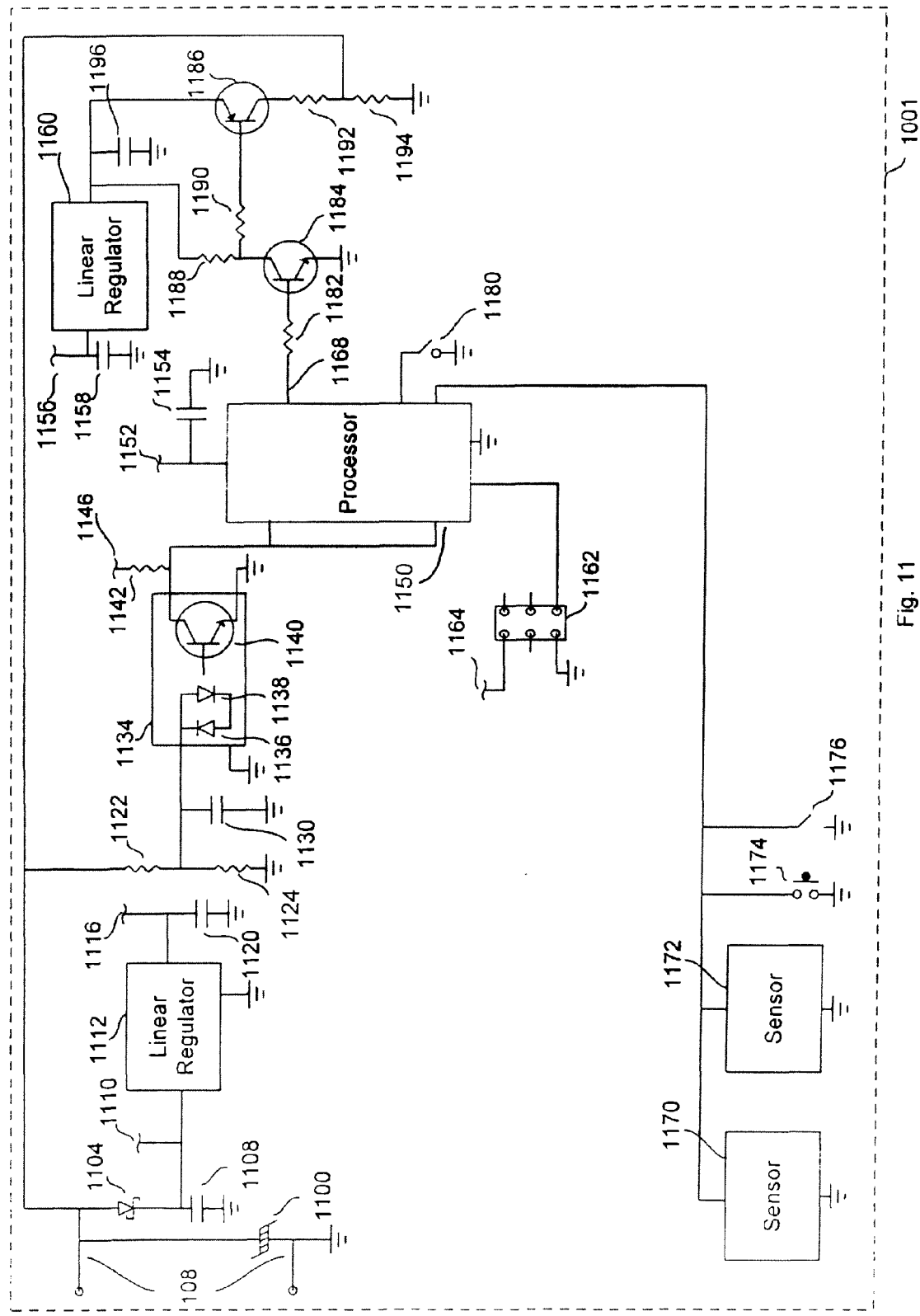
FIG. 11 is a circuit schematic of the control device of FIG. 10.

FIG. 11 is a circuit schematic of the control device 1001. Fewer, more, or different components may be provided. A MOV 1100 is connected across the power supply line 108. The MOV 1100 is used to protect from or suppress overvoltages that may develop or occur on the power supply line 108. Alternatively, other overvoltage suppression devices, such as a thyristor or zener diode, may be used.

A diode 1104 and capacitor 1108 are used to rectify and provide a DC voltage 1110. The voltage 1110 is about 12 VDC. The capacitor 1108 has a capacitance of about 47 µF. Alternatively, other capacitance values may be used. A linear regulator 1112 converts the voltage 1110 into a lower DC voltage 1116. For example, the voltage 1116 is about 3.3 VDC. The linear regulator 1112 is biased by capacitor 1120. The capacitor 1120 has a capacitance of about 47 µF. Alternatively, other capacitance values may be used. The voltage 1116 may be used to provide voltage to other devices of the control device 1001.

A zero-crossing detection circuit 1134 is coupled with the power supply line 108 via a capacitor 1130 and a voltage divider including a resistor 1122 and a resistor 1124. The resistors 1122 and 1124 have a resistance of about 3.3 K Ohms and 1 K Ohms, respectively, and the capacitor 1130 has a capacitance of about 0.1 µF. Alternatively, other values may be used. The voltage divider and capacitor 1130 provide a voltage to diodes 1136 and 1138 that switch a transistor 1140 on or off based on a zero or mean crossing of the square wave or pulse signal on the power supply line 108. The transistor 1140 is a photo-transistor, MOSFET, JFET, PNP, NPN, or other transistor.

For example, the diodes 1136 and 1138 are photo-diodes and/or LEDs that do not emit light when a zero or mean crossing occurs, and the transistor 1140 is a photo-transistor that releases a signal to supply voltage 1146 when there is a zero or mean crossing. Therefore, the processor 1150 recognizes a zero or mean crossing when the supply voltage 1146 is applied from an input to the processor 1150. The voltage 1146 is connected with the zero-crossing circuit 1134 and the processor 1150 via a pull-up resistor 1142. The voltage 1146 is the same as the voltage 1116. The resistor 1142 has a resistance value of about 1 K Ohms. Alternatively, other resistance values may be used. Different pulse widths of the square wave or digital pulse signal correspond to different bits. The processor determines allocated slots or areas in the encoded square wave or pulse signal via the zero or mean crossings. The determination of allocated slots or areas allows the processor to insert or include data or control bits in the encoded square wave or digital pulse signal.

The processor 1150 is similar to the processor 1013. The processor 1150 is powered by the voltage 1152 and a supply capacitor 1154. The voltage 1152 is the same as the voltage 1116. The capacitor 1154 has a capacitance of about 0.1 μF. Alternatively, other capacitance values may be used. The processor 1150 is operable to connect with a connector 1162. The connector 1162 is used to debug or program the processor 1150. For example, the connector 1162 is powered by a voltage 1164, which is the same as or different than the voltage 1116, and includes six pins. Fewer or more pins may be provided.

A switch 1180 may also couple with the processor 1150. The switch 1180 is used to manually turn on or off or control the control device 1001. For example, the switch 1180 is a single or multi-pole switch or other switch supported by a housing of the control device 1001. A switch position of the switch 1180 may command the processor 1150 to operate the components of the control device. Alternatively, the switch 1180 is used to select a remote device or a group of remote devices the control device 1001 is to be associated with.

A sensor 1170, a sensor 1172, a push button or dimmer switch 1174, and/or an on/off switch 1176 may be in communication with the processor 1150. All or some of these receiving or input devices are included in one control device. The processor 1150 outputs one or more signals to include or inject data or one or more control bits in the square wave or pulse signal based on input received from a receiving device, as previously mentioned.

The processor 1150 is operable to send one or more control signals via a pin or port 1168 to include the control data. Other pins or ports may be used. The control circuit 916 is similar to the control circuit 821. For example, the processor 1150 transmits or sends one or more output signals to an injection circuit. The injection circuit includes a linear regulator 1160, a transistor 1184, a transistor 1186, and other passive components.

The linear regulator 1160 may convert a voltage 1156, which may be the same as the voltage 1110, into a lower DC voltage, such as 1.5 VDC. The linear regulator 1160 is biased by capacitors 1158 and 1196. The capacitors 1158 and 1196 have a capacitance of about 47 μF. Alternatively, other capacitance values may be used. The output of the linear regulator 1160 is connected with the transistor 1184 via a resistor 1188. The output of the linear regulator 1160 is also connected with the transistor 1186. The transistors 1184 and 1186 are connected via a resistor 1190, and the pin or port 1168 of the processor 1150 connects with the transistor 1184 via a resistor 1182. An output or emitter of the transistor 1186 is connected with a resistor 1192 and a resistor 1194 acting as a voltage divider. The output of the voltage divider connects with the voltage supply line 108. The resistors 1188, 1182, 1192, and 1194 have a resistance value of about 10 K Ohms each, and the resistor 1190 has a resistance of about 100 Ohms. Other resistance values may be used. The transistors 1184 and 1186 are a MOSFET, JFET, PNP, NPN, or other transistor.

The processor 1150 outputs a signal, such as a pulse width modulated signal, to switch the transistors 1184 and 1186 to generate a pulse, burst, or control bit from the output voltage of the linear regulator 1160. The generated control bit or pulse is inserted or included in the square wave or pulse signal.

Figure 12:
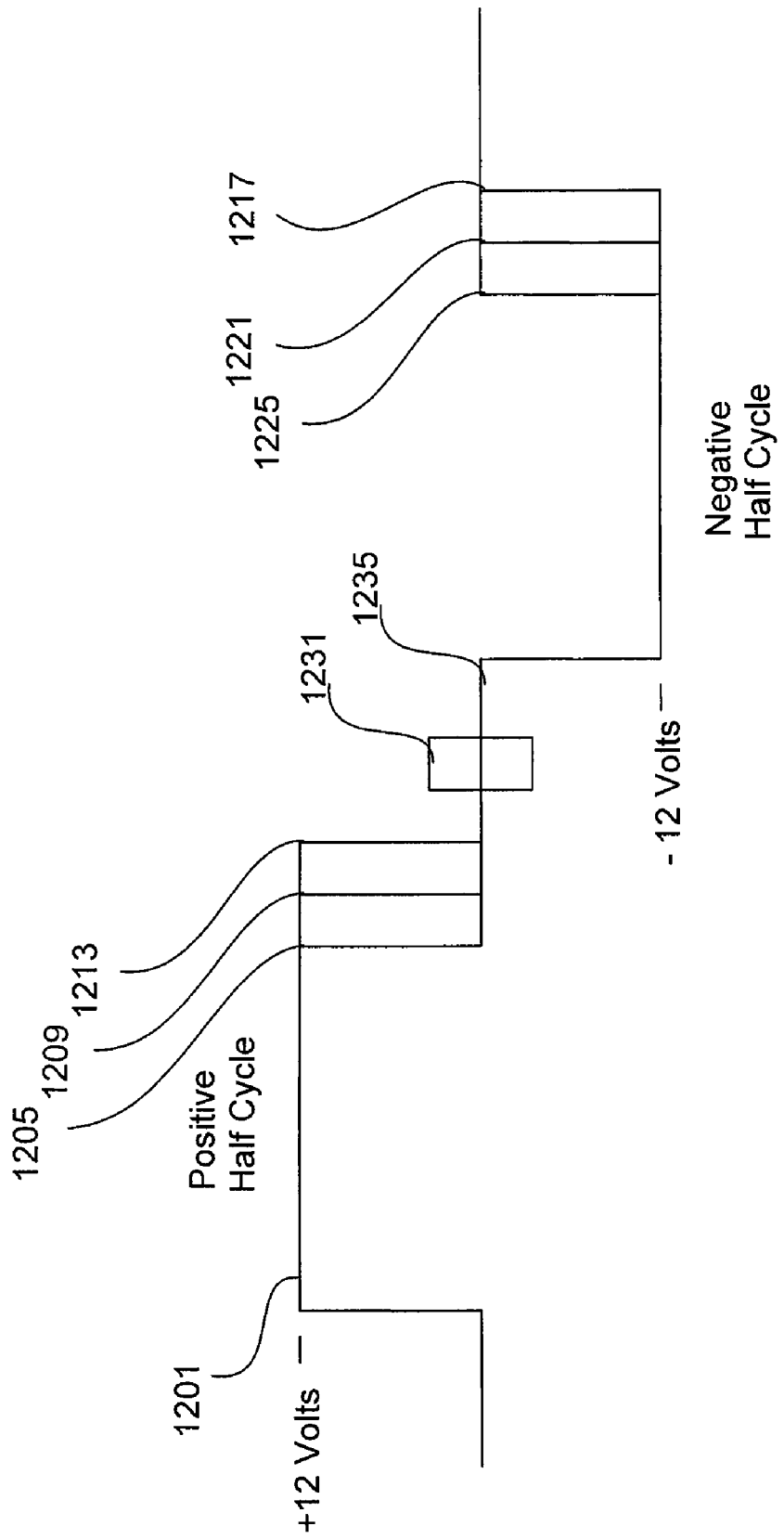
FIG. 12 is a signal provided by the control device of the low voltage system of FIG. 1.

FIG. 12 shows a signal 1201 with an included data or information from a control device, such as the control device 1001. The signal 1201 is similar to the signal 601 that is provided on the power supply line 108 via the power supply 104. For example, pulse widths 1205, 1209, and 1213 are similar to the pulse widths 609, 613, and 617, respectively. Pulse widths 621, 625, and 629 are similar to the pulse widths 1217, 1221, and 1225. A pulse, burst, or signal component 1231 is injected or included in the signal 1201. For example, the pulse 1231 is included in or on a step platform 1235, which is similar to the platform 605. The pulse 1231 is designed to have a voltage low enough, such as a positive or negative 1.5 volts, so that faulty zero or mean crossings may not be detected by the zero-crossing detection circuit 1134.

A control bit corresponds to the platform 1235. For example, the pulse 1231 in the platform 1235 may correspond to a control bit of one, and an absence of a pulse may correspond to a control bit of zero. The platform 1235 is about 250 μs. A sequence of bits are read or processed by the power supply 104 to modify or alter the square wave or pulse signal, such as changing pulse widths, to control one or more remote devices.

Figure 13:
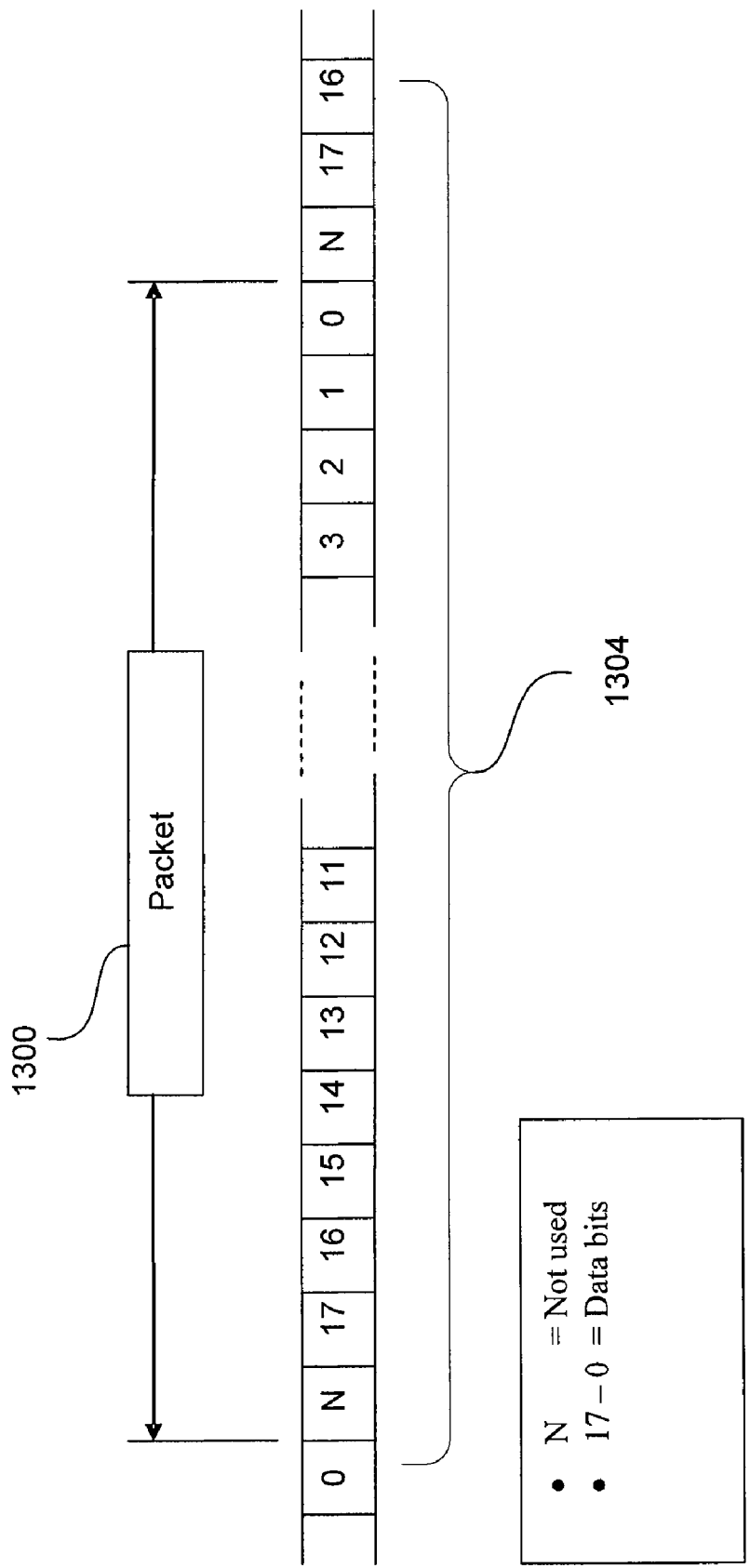
FIG. 13 is a data sequence corresponding to the signal of FIG. 12.

FIG. 13 shows a control data sequence. The control data sequence includes a plurality of packets 1300. For example, one packet 1300 includes 19 bits. The packets 1300 are about ⅓ of a second in duration. For example, one packet 1300 includes data bits 1304. Fewer, more, or different bits may be used. Packets 1300 are sent continuously, repeating about every ⅓ of a second.

18 data bits 1304 are used to send control information to the power supply 104. One of the data bits 1304, N, is not used. A bit position corresponds to a certain control device. Each bit position may be pre-assigned. For example:

| | |
|---|---|
| Bits 0-2 | Group 0, dimmer, data |
| Bit 3 | Group 0, dimmer, present |
| Bit 4 | Group 0, on-off switch 0, data |
| Bit 5 | Group 0, on-off switch 0, present |
| Bit 6 | Group 0, on-off switch 1, data |
| Bit 7 | Group 0, on-off switch 1, present |
| Bit 8 | Group 0, motion sensor, data |
| Bit 9 | Group 0, motion sensor, present |
| Bit 10 | Group 1, on-off switch 0, data |
| Bit 11 | Group 1, on-off switch 0, present |
| Bit 12 | Group 1, on-off switch 1, data |
| Bit 13 | Group 1, on-off switch 1, present |
| Bit 14 | Group 1, motion sensor, data |
| Bit 15 | Group 1, motion sensor, present |
| Bit 16 | Group 0 and 1, photo control, data |
| Bit 17 | Group 0 and 1, photo control, present |
| Bit 18 | not used (co-incident with transmit start bit) |

In some embodiments, bit 18 is not used so as to enable a remote device to communicate information to the power supply 104 during the time period associated with bit 18.

Groups 0 and 1 may correspond to two sets or groups of remote devices. Certain bit positions are allocated for a present bit. The present bit allows the power supply to be cognizant of what devices are connected with the power supply line.

For example, a 3 bit dimming code is outputted from a user control knob or switch. The 3 bit dimmer data is assigned to group 0 only, and group 1 does not support dimming. Dimming may be limited to 4 pre-assigned levels 0-3, and other levels, such as levels 4-7, are reserved for other functional implementations. Both lighting groups may support independent on/off switch functions. Up to two on/off switches may be used per group. A single on/off switch may implement a simple on/off lighting function. When two on/off switches are present, a "3-way" on/off switch function may be implemented automatically. Individual motion sensors may be supported for both groups 0 and 1. A motion sensor may be implemented with a PIR (passive Infrared) sensor. When implemented, the motion sensor may allow the system to come to full brightness when motion in the appropriate area is detected. A common photo control input may be used for both lighting groups to implement such functions as on at dusk, off at dawn, on then delay to off, full on, and full off.

Each control device may transmit a device present bit when attached to the lighting line. This bit may be transmitted continuously. The present bits allow the power supply to determine proper control algorithms. For example, if a dimmer control device and a motion sensor control device are present in a lighting system, the dimmer control device may set the dim lighting level and the motion sensor control device, when activated, may bring remote light devices to full brightness for a pre-defined time. If a dimmer control device and a photo control device are present on the line, the dimmer control device may set maximum light level and the photo control device may turn on the lights from full off at dusk.

The electrical circuits described above may include parts or components manufactured by Freescale Semiconductor, Inc., Motorola, Inc., National Semiconductor Corp., Infineon Tech., and/or other manufactures. For example, the processors described above may include a MC9S08 series microprocessor from Freescale Semiconductor, Inc.

Figure 14:
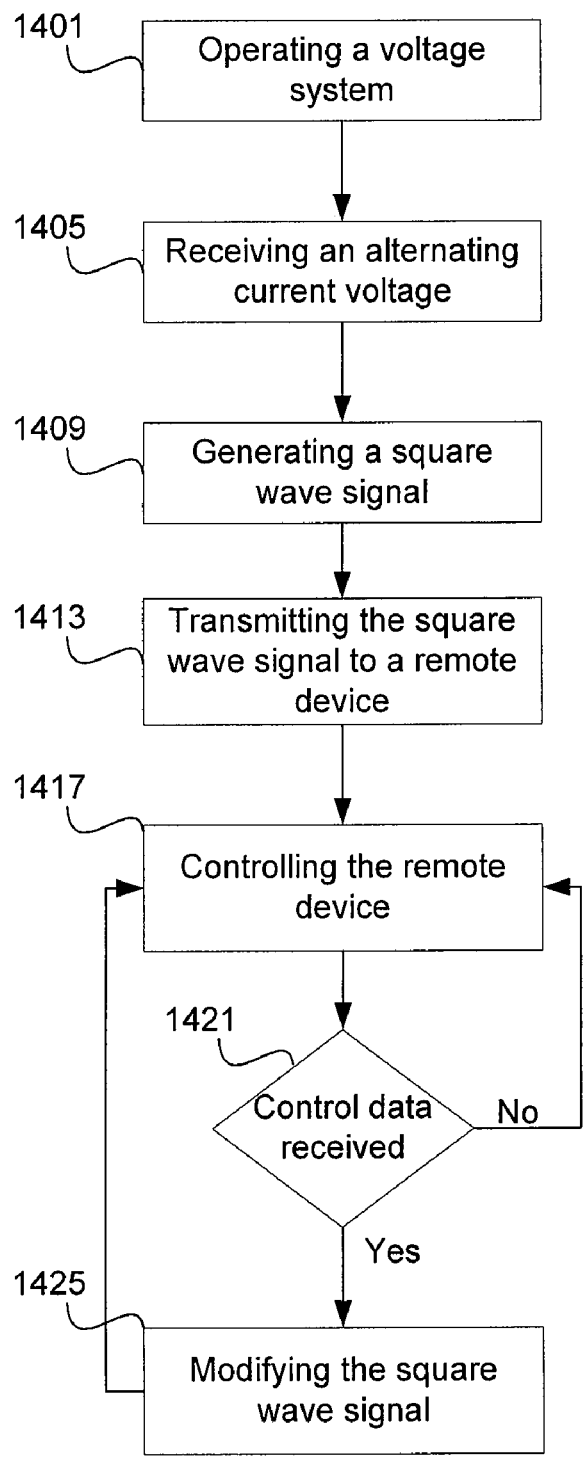
FIG. 14 is a flowchart illustrating a power control method.

FIG. 14 illustrates a power control method. Fewer or more acts or blocks may be provided. A voltage system, such as the voltage system 100, may be operated, as in block 1401. For example, a homeowner may turn on a power supply, such as the power supply 104, to operate an outdoor lighting system as well as other remote devices coupled with a power supply line, such as the power supply line 108. Alternatively, the power supply may turn on based on a timer control or a photo control.

In block 1405, an alternating current voltage is received. For example, the power supply is plugged into a 110 VAC outlet or connected with power source configured to generate about 110 VAC. Circuitry of the power supply receives the 110 VAC. A square wave signal or pulse signal, such as the signals 500 or 601, is generated from the 110 VAC, as in block 1409. For example, the circuitry of FIG. 2 and/or FIG. 3 may be used to generate the square wave signal or pulse signal. The power supply converts the 110 VAC to a DC voltage, and a processor in the power supply generates the square wave signal or pulse signal by controlling a switching circuit. The switching circuit, for example, includes one or more half-bridge circuits.

In block 1413, the square wave signal or pulse signal is transmitted to a remote device. For example, the square wave signal or pulse signal is transmitted over the power supply line to power remote devices and/or other devices, such as control devices, coupled with the power supply line. The square wave signal or pulse signal not only powers the remote devices but it also provides communication to control one or more remote devices, as in block 1417. The square wave signal or pulse signal is encoded with bit sequences, as described in regards to FIGS. 5, 6, and 7, that can be read or processed by a remote device.

In addition to the square wave signals above, other signals may be utilized to communicate information and deliver power so as to enable powering and communicating with a remote device. For example, any AC power signal that has an average DC value of zero volts may be utilized, such as a sinusoidal signal. One way in which data may be encoded on the sinusoidal signal is via a frequency-shift-keying approach, where the frequency of the signal is shifted over cycles of a sinusoidal wave depending on whether a 1 or 0 is being sent. For example, 60 Hz may be utilized to communicate a 1 and 70 HZ may be utilized to communicate a 0. The power may also be derived from the sinusoidal signal. The data may be encoded other way as well, such as via Manchester encoding.

For example, the remote devices may be outdoor lights, and by setting a pulse width of the square wave signal or pulse signal may correspond to a certain bit. The outdoor light reads a bit sequence generated by different pulse widths and responds to the bit sequence, such as by turning off or on, dimming, or increasing a brightness level. Therefore, one or more remote devices may be controlled while still powering other devices. For example, a group of lights may be turned off during the day, and power to another remote device, such as a radio, may still be supplied to operate the other remote device. The power supply may stay on for any desired time period.

In block 1421, control data, such as the pulse 1231, is received or not received by the power supply. For example, if control data is not received by the power supply, the power supply will continuously transmit the square wave signal or pulse signal in a present state. If control data is received by the power supply, the power supply modifies the square wave signal or generates a different square wave signal, as in block 1425. For example, a control bit may be included in the square wave signal or pulse signal, as discussed in regards to FIGS. 12 and 13. A control bit sequence is read or processed by the power supply. Based on the control bit or bit sequence, the power supply modifies or generates a square wave signal or pulse signal with one or more different pulse widths (in each packet) to control one or more remote devices. For example, if a user activates a control device, such as the control device 124, 128, 132, or 1001, to turn off some outdoor lights, the power supply will modify or output a square wave signal or pulse signal that includes a bit sequence to command the lights to turn off.

Figure 15:
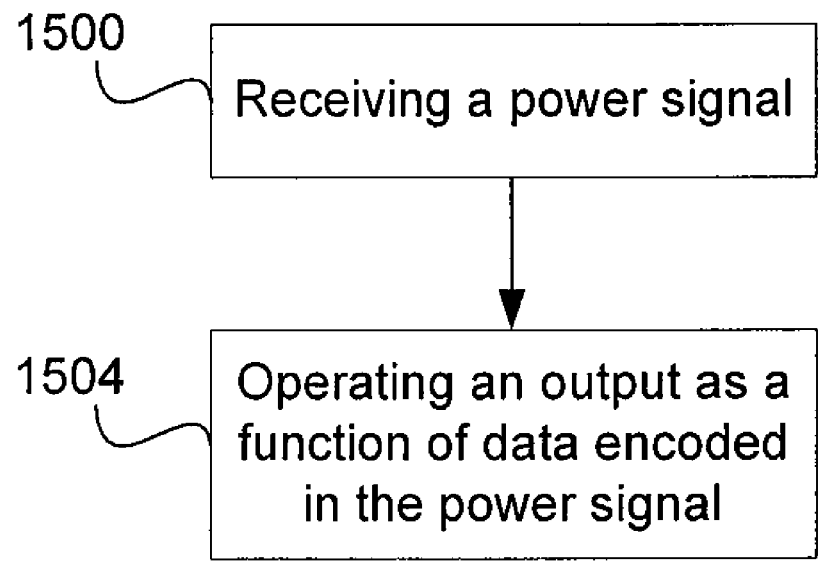
FIG. 15 is a flowchart illustrating another power control method.

FIG. 15 illustrates another power control method. Fewer or more acts or blocks may be provided. A power signal, such as the signal 500 or 601, is received by a remote device, such as the remote devices 112 or 116, as in block 1500. The remote device is coupled with a power supply line, such as the power supply line 108, and receives the power signal over the power supply line. The power signal is a square wave signal or pulse signal that is encoded with bit sequences, as described in regards to FIGS. 5, 6, and 7. In block 1504, an output of the remote device is operated as a function of the encoded data. The remote device processes or reads the data or bit sequence and correlates the data with a desired action. For example, the remote device may be an outdoor light. The light determines whether to turn on or off or decrease or increase a brightness level based on the data in the power signal.

Figure 16:
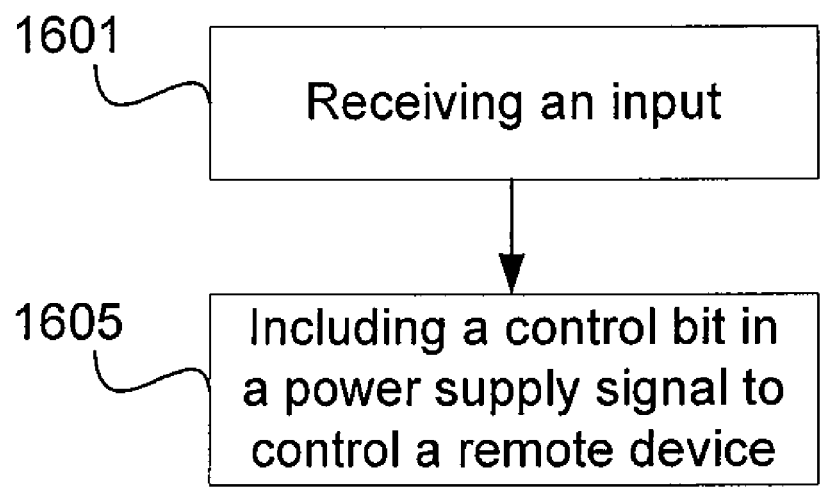
FIG. 16 is a flowchart illustrating another power control method.

FIG. 16 illustrates a power control method. Fewer or more acts or blocks may be provided. An input is received by a control device, such as the control device 124, 128, 132, or 1001, as in block 1601. The control device is coupled with a power supply line, such as the power supply line 108. Alternatively, the control device communicates with the power supply line and/or a power supply, such as the power supply 104, wirelessly. For example, motion or light is sensed by the control device or a user activates an on/off or dimmer switch of the remote device. In block 1605, based on such input, the control device generates a pulse that is injected or included, as described in regards to FIGS. 10, 11, and 12, in a power supply signal, such as the signal 500, 601, or 1201. The included pulse corresponds to a control bit, and a control bit sequence is read or processed by the power supply. The power supply alters or generates a power signal, such as a square wave signal or pulse signal, to control remote devices, as previously mentioned.

Other features described above may be used for additional or other methods of use. Also, the features, components, and/or structures described above may be organized or identified in one or more methods of manufacture.

The logic, software or instructions for implementing the processes, methods and/or techniques discussed above may be provided on computer-readable a non-volatile memory, such as an EEPROM or Flash memory. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like.

It is intended that the foregoing detailed description be regarded as illustrative rather than limiting, and that it be understood that the following claims, including all equivalents, are intended to define the scope of this design.

We claim:

1. An intelligent device comprising:
   a power supply operable to generate a DC voltage from an input voltage communicated via a low voltage line by a power source, wherein the input voltage corresponds to an AC voltage with a positive cycle, negative cycle, and an intermediate platform;
   a receiver operable to extract timing data from the input voltage; and
   output circuitry operable to communicate information to the power source via the low voltage line.

2. The intelligent device according to claim 1, wherein the power source controls a remote device in accordance with a data pattern communicated.

3. The method of claim 1, wherein the power source corresponds to a low voltage lighting power supply.

4. The intelligent device according to claim 1, further comprising a sensor.

5. The intelligent device according to claim 1, further comprising a switch.

6. The intelligent device according to claim 1, wherein the remote device corresponds to a remote lighting device.

7. The intelligent device according to claim 1, wherein the data pattern is encoded by varying a width of at least one of: the positive cycle and the negative cycle.

8. The intelligent device according to claim 1, wherein the AC voltage comprises a square wave pulse.

9. The intelligent device of claim 1, wherein the output circuitry communicates information by inserting a pulse during a time associated with the intermediate platform.

10. An intelligent device comprising:
    a receiver; and
    a processor in communication with the receiver, the processor operable to receive an input signal from the receiver and output an output signal, the output signal comprising a control bit that is a function of the input signal,
    wherein the output signal
        corresponds to an AC voltage with a positive cycle, negative cycle, and an intermediate platform and
        is used to control a remote device over a low voltage line, and wherein the control of the remote device is based on the control bit.

11. The intelligent device of claim 10, wherein the receiver comprises a sensor.

12. The intelligent device of claim 10, wherein the receiver comprises a switch.

13. The intelligent device of claim 10, wherein the processor is within a housing, and wherein the housing is configured to be placed in an outdoor environment.

14. The intelligent device of claim 10, wherein the remote device comprises a light of an outdoor lighting system.

15. The intelligent device of claim 10, wherein the output signal powers the remote device.

16. The intelligent device according to claim 10, wherein a data pattern is encoded on the output signal by varying a width of at least one of: the positive cycle and the negative cycle.

17. The intelligent device according to claim 10, wherein the AC voltage comprises a square wave pulse.

* * * * *